United States Patent
Thario

(10) Patent No.: US 11,089,076 B1
(45) Date of Patent: Aug. 10, 2021

(54) AUTOMATED DETECTION OF CAPACITY FOR VIDEO STREAMING ORIGIN SERVER

(71) Applicant: Amazon Technologies, Inc., Seattle, WA (US)

(72) Inventor: James Edward Thario, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 388 days.

(21) Appl. No.: 15/913,524

(22) Filed: Mar. 6, 2018

(51) Int. Cl.
*H04L 29/06* (2006.01)
*H04L 12/26* (2006.01)

(52) U.S. Cl.
CPC .............. *H04L 65/80* (2013.01); *H04L 43/16* (2013.01); *H04L 65/60* (2013.01)

(58) Field of Classification Search
None
See application file for complete search history.

(56) References Cited

U.S. PATENT DOCUMENTS

| | | | |
|---|---|---|---|
| 8,977,903 B1* | 3/2015 | Chandrasekharapuram | H04L 43/50 714/32 |
| 2002/0161553 A1* | 10/2002 | Har'El | G06F 11/3414 702/186 |
| 2007/0177513 A1* | 8/2007 | Kuokkanen | H04W 24/00 370/241 |
| 2009/0271152 A1* | 10/2009 | Barrett | G06F 11/3409 702/186 |
| 2013/0019023 A1* | 1/2013 | Hemed | H04L 43/50 709/231 |
| 2016/0292058 A1* | 10/2016 | Sathyanarayana | H04L 43/50 |
| 2018/0176117 A1* | 6/2018 | Gudetee | H04L 12/4641 |

* cited by examiner

*Primary Examiner* — Younes Naji
*Assistant Examiner* — Da T Ton
(74) *Attorney, Agent, or Firm* — Nicholson De Vos Webster & Elliott LLP

(57) ABSTRACT

A system for testing the streaming capacity of a media streaming system, or of one or more origin servers thereof, includes a control system that controls the provisioning of computing resources, such as virtual machine instances, configured as load generators. The load generators establish a plurality of concurrent streams of content from the media streaming system, thus representing a plurality of connected user devices. The streams impart a load on the media streaming system; additional load generators can be added to a scalable group to increase the load. The load generators can produce monitoring data describing errors in network activity (e.g., dropped packets) and in the stream data itself (e.g., synchronization errors). A metric analysis system calculates performance metrics based on the monitoring data, and signals the control system to add or remove load generators until the load is as high as possible without degrading service, revealing the streaming capacity.

19 Claims, 14 Drawing Sheets

AUTOMATED DETECTION OF CAPACITY FOR VIDEO STREAMING ORIGIN SERVER

BACKGROUND

Generally described, computing devices utilize a communication network, or a series of communication networks, to exchange data. Companies and organizations operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

Service providers or content creators (such as businesses, artists, media distribution services, etc.) can employ interconnected computing devices (e.g., within data centers) to deliver content to users or clients. In some instances, these computing devices may support traditional content distribution systems, such as by creating, modifying, or distributing streaming television or radio content. In other instances, these computing devices may serve to replicate or replace prior content distribution systems. For example, data centers can provide network-based streaming audio or video content in a manner similar to traditional television or radio networks. This content is sometimes referred to as "internet television" or "internet radio," respectively. The content provided by these distribution systems (e.g., both traditional and computing network-based) may be pre-recorded, or live. Often, where computing devices are used to facilitate either traditional or network-based distribution systems, specialized software, or combination hardware/software systems, replace or replicate functionality of dedicated hardware devices. For example, software applications may be used to encode and package a data stream containing live video content, thus reducing or eliminating the need for dedicated hardware to perform these functions.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
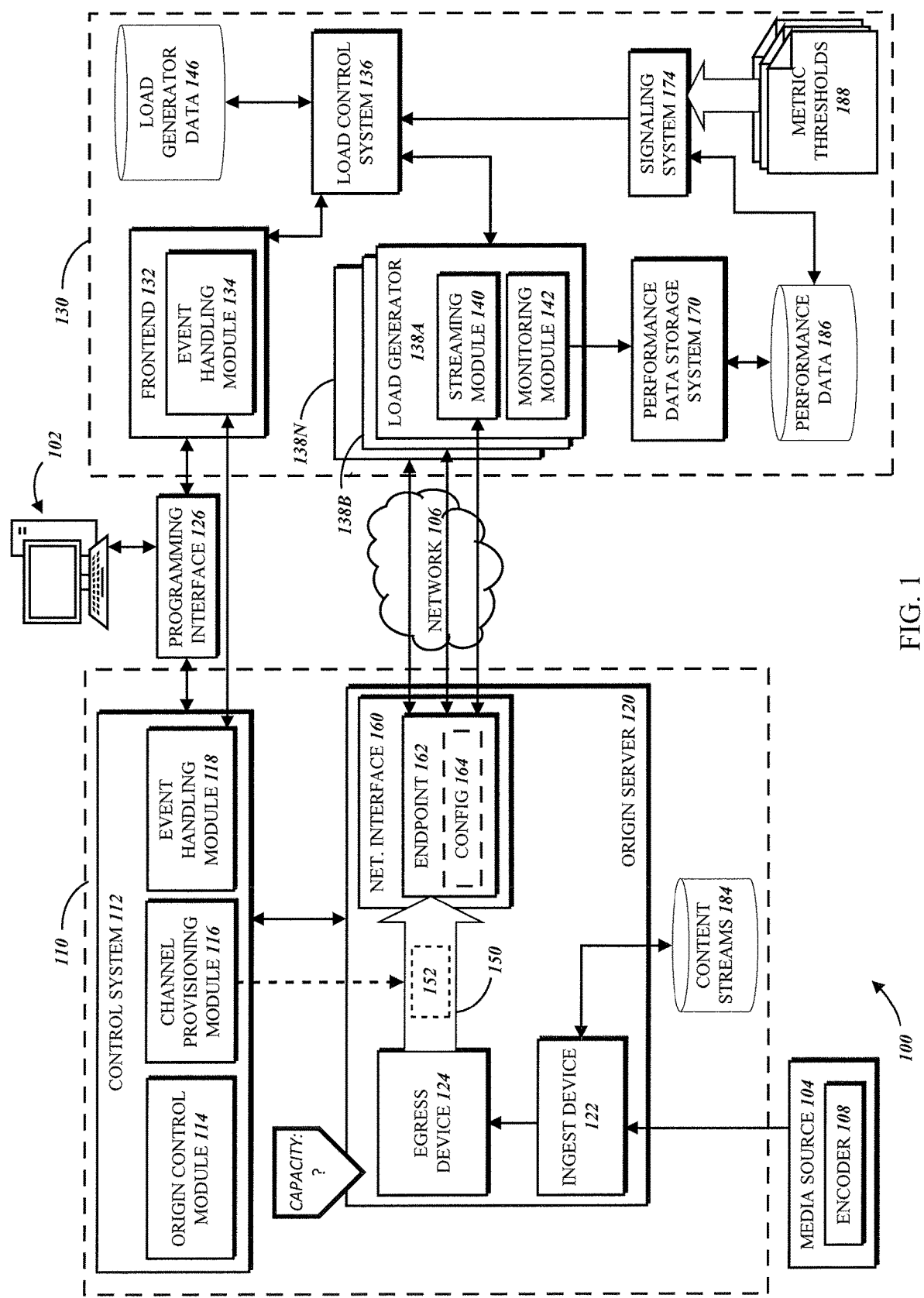
FIG. 1 is a block diagram of an example media stream delivery system and capacity testing system that enables automatic determination of streaming capacity of the media delivery system, in accordance with the present disclosure.

Generally, a media streaming system in a computing environment includes components for generating and delivering one or more encoded media streams to requesting devices over a content delivery network (CDN) or another communication network. An encoded media stream is a sequence of data packets representing audio, visual, and/or audio/visual data (referred to generally herein as "media" or "content") and having an encoding format that is readable by end-user computing devices and by other system components. The encoding format determines which media playback programs can decode and display the encoded media stream, and sets stream parameters such as codec used, bitrate, image dimension, resolution, chroma sub sampling, group of pictures (GOP) length, GOP structure, scan type, transport type, audio sampling rate, video frame rate, and forward error correction, to name a few. An encoded media stream can be stored, such as in an electronic data store, as an electronic file or as a collection of files each encoding a discrete segment of the encoded media stream, together with a manifest or other file listing the component segments in order of their appearance in the stream. Exemplary encoding formats generate distributable output files such as .MPEG or .MP4 files. These files may be read by many standard media players installed on user computing devices, such as laptops, tablet computers, mobile phones, desktops, portable audio and/or video playback and/or recording devices, etc. The media streaming system can include one or more encoders that convert raw content from one or more media sources into an encoded media stream in this manner.

The encoded media stream may be "packaged," perhaps using multiple different packaging schemes, to encode the encoded media stream in different configurations that can be processed by certain content delivery devices and/or user devices, or that can be adapted to changing network conditions. For example, packaging a live stream may reformat the live stream into a different transport protocol packaging standard, add digital rights management attributes to the live stream, inject other content such as advertisements into the stream, make copies that stream at lower resolutions or bit rates, integrate video-on-demand features such as pause and rewind, and the like. For some streaming protocols, such as HTTP Live Streaming (HLS) by APPLE, packaging a content stream may include dividing the content stream into segments of equal length.

After packaging, the data segments can be distributed to end user devices connecting to the media streaming system via a CDN. In one example, a packaged encoded media stream is delivered through one or more endpoints that can receive connections from one or more user devices over the external computer network. Each endpoint can have an internet protocol (IP) address that may expose the endpoint to user devices, either directly (i.e., a "public" IP address that can be typed into a browser address bar on a user device) or through a router or load balancer that can identify incoming connections and determine the appropriate endpoint for the requesting device. The system may set up a "channel" for each packaged variant of an encoded media stream, and there may be hundreds, even thousands, of variants to make the content compatible with and deliverable to a wide range of user devices, from desktop computers to smart televisions to smartphones and across operating system, kernel, and software platforms.

The media streaming system may include one or more origin servers that package and deliver the encoded media stream through particular channels and particular CDNs to particular user devices as described above. An origin server can be one or multiple computing hardware device(s) preparing content and then serving the content to a frequently-changing number of user devices connected to the origin server over one or more "internal" (i.e., within the computing environment of the origin server; e.g., a local area network or a virtual network) and/or "external" (i.e., outside of the computing environment). An origin server may include one or more ingest devices for packaging content, one or more egress devices for streaming content, and one or more network interfaces for providing connections between the egress devices and requesting user devices. The limits of processing power, memory, and access to network bandwidth of an origin server determine its capacity to serve content to requesting devices. Multiple origin servers may be deployed for various uses, such as to provide redundancy, to expand capacity or geographic reach, to serve different types of content, or to serve content over isolated, restricted, incompatible, or otherwise disparate networks.

In some embodiments, a connected user device "streams" an encoded media stream from a media streaming system by requesting and then receiving sequential segments of the media stream at a rate that enables continuous playback of the steam on the user device. The requests and stream data exchanged between the media streaming system and a user device comprise the "load" that the user device imparts on the media streaming system. Generally, the load of one user device can be measured in the number of requests per second for a segment of an encoded media stream. In some cases, all connected user devices can make the same number (or maximum number) of requests per second; thus, the overall load on the media streaming system can be measured in number of connected user devices, which is a relatable metric for system designers and product planners alike.

A media streaming system can include hardware and/or software load balancers to distribute incoming requests across multiple origin servers. One reason to balance the load is to keep an origin server from reaching or exceeding a maximum load, or capacity (in requests/sec or number of active connections) of the origin server, beyond which the origin server's ability to deliver the requested media streams begins to be negatively impacted. A media streaming system may itself have a capacity, such as the sum of the capacities of all origin servers executing in the service. The system capacity may be fixed, if the number or capacity of origin servers cannot be increased; or, the system capacity may be scalable by adding or removing origin server instances. When active connections exceed capacity, video quality, server response time, and other performance characteristics of the streaming can decrease.

Knowing the capacity of a single origin server allows for efficient scaling and other system planning. For example, where all origin servers in a media streaming system are identical (e.g., launched using the same virtual machine image), the system capacity is simply the single-server capacity multiplied by the number of active origin servers. The capacity can also be an input into more complex analyses. For example, if the capacity is known and the system is suffering degraded performance without the maximum number of user devices connected, the problem is likely in a device other than the origin server (though this is not always true—a problem addressed herein). The capacity of a single origin server is typically found in a manual way—by a system administrator constantly watching feedback from each connected user device and adjusting the entire client load to maintain an acceptable quality of the streaming experience (pre-determined based on threshold values for a set of streaming properties) while attempting to find the capacity. It can take a very long time, commonly several days, to collect and evaluate enough data to determine the capacity.

Additionally, changes to the system, such as deployment of new resources, driver and software updates, and the like, can affect the capacity of an origin server. In one example, virtual machine instances of an origin server are launched from a machine image specifying a "stack" of computer components, which can include the operating system, file system, communication protocols (e.g., link layer through application layer), and software programs for serving the media streams. Changes to any of the components can impact the maximum performance and capacity that a single instance of the origin server can handle. For example, an update to a kernel driver for a critical device or service, even without changes to source code of the server programs, can affect the performance of the entire instance. So, the capacity determination must be performed when a new origin server is deployed into the system and may have to be repeated frequently.

The present disclosure provides systems and methods for automatically determining the capacity of a computing system's streaming media service. In one aspect, the capacity may be the maximum number of user devices that are able to simultaneously use the service with in predetermined thresholds for performance characteristics, such as video quality, response time latency, and the like, that represent a suitable streaming experience. It is noted that other measurements for capacity, such as maximum number of requests for media stream data per second, may be used even when the below examples do not use them. The detailed description below includes example embodiments, and refers to the Figures, which also illustrate example embodiments; these embodiments are described as delivering video (i.e., synchronized audio and video data) to user devices, but it will be understood that the present systems and methods can be used to deliver audio-only streams and data streams for any other type of media. The present systems and methods enable the determination of capacity, and changes in capacity, faster and with much less manual (i.e., human administrator) oversight compared to existing capacity tests.

The present system may initiate a capacity test against a target origin server or against the entire media streaming system. In some embodiments, the system initiates the capacity test in response to a triggering event, such as a notification that a new origin server is prepared for deployment, or if there are system updates or other changes that may affect the capacity of an existing origin server; the triggering event may also be a user input, such as an "execute test" command entered into a user interface associated with the media streaming system. The system may include a capacity testing system that simulates stream request traffic from user devices located at one or more network locations. In some embodiments, the capacity testing system may allocate and deploy one or more load generators that simulate a connected user device by connecting to a target origin server (e.g., through a network interface as described above) and requesting an encoded media stream. In one embodiment, a load generator may generate a substantially constant, predetermined (e.g., user-specified) load on the origin server, such as by submitting stream requests continuously or at a predetermined interval. The system may connect or detach multiple load generators with the same configuration to the origin server, thereby increasing or decreasing an aggregate test load on the origin server by a known amount.

In some embodiments, a load generator may be a collection of virtualized computing resources, such as a virtual machine instance or a virtual container instance. In another embodiment, a load generator may be a dedicated hardware computing device. The load generator may have a network interface, and may be assigned a network address (e.g., IP address) and have networking software installed that enables the load generator to communicatively connect to the origin server. For example, the load generator may use hypertext transfer protocol (HTTP) to connect to an endpoint of the media streaming system that is associated with the origin server. The load generator may further include program instructions that, when executed by a processor (e.g., a hardware processor allocated to the load generator's virtual machine instance), cause the load generator to request media stream data segments, and to receive and process the segments in accordance with the processes of a typical stream playback program. For example, a media playback program may be installed on the load generator. The media playback program may be fully functional (i.e., receives a content stream and renders it to display and/or audio devices, or may simply simulate playback by performing some of the functions of a media player, such as communicating with the origin server and receiving, decoding, and detecting errors in video streams, while not rendering the video stream for actual playback.

A load generator may simulate a single connected user device, or a plurality thereof. For example, the load generator may generate stream requests at a volume and rate equivalent to 60 unique user devices; connecting ten distinct load generators (e.g., virtual machine instances) to the origin server thus simulates 600 simultaneously connected user devices. A load generator may further include program instructions, such as logging software, that when executed cause the load generator to monitor the transmission and quality of the media stream, and to generate data describing one or more performance characteristics. Non-limiting examples of performance characteristics monitored by the load generator include: video resolution of delivered stream; audio and video synchronization accuracy; dropped packets or requests; origin server response latency; HTTP response code generated in response to a request; and the like. Each connected load generator may collect data describing its own connection to the origin server, such as by creating and/or obtaining network interface logs that record parameters of network activity. In some embodiments, a load generator may be configured to perform some processing of the data, such as aggregating, averaging, and/or normalizing data collected over an interval, or otherwise calculating performance metrics as described further below. The load generators may store collected and/or processed data in a local data store associated with the capacity testing system or with a virtual computing environment in which the load generators are operating. Additionally or alternatively, the load generators may send the data (continuously as a monitoring data stream, or at intervals) to a centralized data storage and processing service.

For example, the system may include a performance data processing service that receives the collected monitoring data from the deployed load generators. This service may store the received data, and/or may process the data to identify the most recently reported values for the monitored performance metrics. For example, the service may aggregate recorded values for a metric, across either or both of: a predetermined time window during which the values were collected; and, all or a subset of the load generators. The service may store the aggregate values in a new performance data record of an indexed performance data store. The performance metrics may be indexed with respect to various time windows useful for identifying the origin server's response to varying the number of simulated connected user devices. One such time window is the duration of an entire capacity test, which in the present system may extend for several (e.g., two or three) hours. Another example time window begins when the number of load balancers connected to the origin server is changed, and ends when the number is changed again. Another example time window begins when the number of simulated user devices is changed, and ends when the number is changed again.

The capacity testing system may include components that continuously or periodically evaluate the indexed performance metric data to determine if the load should be increased or decreased. The data may be compared to one or more stored threshold values for the corresponding performance metrics, which thresholds represent an acceptable quality of service level for the origin server delivering media streams to connected user devices. The test load may be adjusted based on these comparisons. For example, if the performance metric data violates a threshold, the capacity testing system may reduce the number of simulated connected users (e.g., by detaching a load generator) and then reevaluate newly produced monitoring data to determine if enough user devices have been detached. Additionally or alternatively, the indexed performance metric data may be evaluated to determine whether performance of the origin server has "settled"—that is, the values of aggregate, indexed performance metrics have remained consistent, and slightly below the thresholds, over a predetermined period of time where the load has not been increased. This indicates that the present load represents the origin server's capacity, or maximum number of connected user devices that the origin server can handle while maintaining an acceptable quality of service level.

In an example use case, the capacity testing system can be offered as a service of a computing resource service provider to the provider's authorized customers, particularly to those customers that also use a media streaming service of the provider. A customer can use a web application, command line console, or other programming interface to configure and activate the capacity testing system. For example, the customer can identify triggering events, such as the creation or reconfiguration of an origin server or the initiation of a network stack driver update, which cause the capacity testing system to execute within virtual computing resources allocated to the customer's account. The capacity testing system can report the determined value to other components and/or services of the system. For example, the media streaming system may receive and store the capacity for use in determining whether to reject connection requests from new user devices, or to launch more origin servers to rebalance the load. In another example use case, the capacity testing system can be a standalone product or service that a user can execute against its own or another entity's origin servers, in a computing environment external to the origin servers' native computing environment. The capacity testing system can obtain the capacity of a single origin server, or of multiple origin servers, or of an entire media streaming system, and can dynamically according to the size (i.e., number of origin servers) and spread (i.e., across geographic regions and/or different computer networks) of the media streaming system. Additional details and embodiments of the capacity testing system and concomitant methods are described below with respect to FIGS. 1 through 10.

Referring to FIG. 1, a computing environment 100 is shown implementing an example embodiment of the present systems for determining the streaming capacity of a media streaming system 110. The environment 100 includes a media streaming system 110 that may be a virtual computing system implemented on one or more hardware computing devices, such as server computers, alone or in combination with one or more electronic data storage devices, as described further herein. In one embodiment, the components of media streaming system 110 may be provided by a computing resource service provider, such as those providing cloud services including, for example, infrastructure as a service (IAAS), platform as a service (PAAS), and/or software as a service (SAAS). Generally, access to the media streaming system 110 is provided to external computing devices via one or more interfaces. The interfaces may be physical device interfaces, such as communication ports, buses, and the like, and/or may be virtual interfaces such as application programming interfaces (APIs), web-based user interfaces, device-based user interfaces, and the like. Different types of user may access the media streaming system 110 through different interfaces. Examples of such interfaces include, without limitation: a programming interface 126 exposed to a client device 102 for enabling a content manager, system administrator, etc., to configure the media streaming system 110; a network interface 160 providing physical and/or virtual ports that communicate with a computer network 106, such as the internet, a content distribution network (CDN) associated with the media streaming system 110, and the like, to facilitate connections of end user devices (not shown) for receiving content streams over the network 106; and, one or more APIs (not shown) accessible to a device associated with a media source 104 for providing content steams to the media streaming system 110.

A media source 104 may be an entity operating a recording and/or playback device, or may be the recording/playback device itself, that has captured or is capturing media data and is set up to transmit the media data to the media streaming system 110. For example, the media source 104 may be present at a physical location at which an event is occurring, and may be recording the event and transmitting the recorded data. For example, the media source 104 can be at the site of a news story, a stadium, an arena, or the like.

The entity/device can use a contribution encoder 108 to transmit a live or prerecorded stream to the media streaming system 110. A live stream can include one or more data packets that include encoded media (e.g., video, audio, audio and video, etc.). In an embodiment, the contribution encoder 108 is a computing device or computer program that receives media from a source (e.g., a camera, a microphone, etc.) and encodes the media for transmission to the media streaming system 110. A single contribution encoder 108 can receive media from one or more sources. The media source 104 can also include multiple contribution encoders 108 each receiving media from a different source (e.g., different camera angles or views captured from various locations at the same event, media captured from cameras located at different events, etc.).

In some embodiments, encoder 108 transcodes the raw media data or other live stream of the feed into a certain format, bitrate, and the like, producing an encoded media stream and/or data segments thereof. For example, an encoder can transcode a live stream based on settings provided by the client device 102 during the live stream set up. In other embodiments, the encoder 108 does not transcode the live stream. An entity can manually set values for parameters for encoding the media. Alternatively, parameter values can be received automatically from encoders 108 or from a live media encoding system. The parameters can include the codec (e.g., audio codec, video codec, etc.), bitrate (e.g., audio bitrate, video bitrate, etc.), image dimension, chroma subsampling, GOP length, GOP structure, scan type (e.g., progressive, interlaced, etc.), transport type (e.g., user datagram protocol (UDP), transmission control protocol (TCP), etc.), audio sampling rate, video frame rate, forward error correction (FEC) type (e.g., automatic repeat request (ARQ), RAPTORQ™, etc.), or the like.

After an optional transcoding of its content (e.g., live stream), the media source 104 can forward the generated encoded media stream to the media streaming system 110. In some embodiments, the feeds from media sources 104 may be delivered to the control system 112 and/or to an ingest device 122, which may determine how to process the incoming raw media data, live stream, prerecorded stream, or other feed. In some embodiments, the control system 112 and/or the ingest device 122 may send the raw media data to a content stream data store 184. The control system 112 and/or the ingest device 122 may perform various integrity checks on the raw data before allowing the feed to be ingested into the system 110.

An entity can use the client device 102 (e.g., desktop, laptop, mobile device, etc.) to send an instruction to the control system 112 to set up a new content stream that will be received from the media source 104 and delivered to end users by one or more origin servers 120 of the media streaming system 110. The instruction can include parameters of the content stream and its mechanism(s) for delivery to end user devices. Non-limiting examples of such parameters include: duration of the content stream; stream encoding parameters (e.g., format, codec, resolution, bitrate, frame rate, etc.); stream variants to be made available, and their encoding parameters; channel(s) that will transmit the content stream; and users or user groups authorized to receive the content stream. In some cases, the instruction may identify a configuration for an origin server 120 that will package and deliver the content stream. In one example, a programming interface 126 may enable the entity to enter origin server 120 parameters; the control system 112 may receive the parameters and create a new origin server 120, or may store the parameters as a virtual machine image or a template for launching one or more instances of an origin server 120 in the future. Alternatively, the entity may be able to select an origin server 120 configuration from a list of existing configurations. For example, the media stream system 110 may store or reference one or more machine images or templates that it uses to launch new virtual machine instances of an origin server 120; the programming interface 126 may display these images/templates as selectable items.

In response to receiving the instruction, the control system 112 can allocate and configure media streaming system 110 computing resources, such as origin servers 120, ingest devices 122, egress devices 124, channel(s) 150, endpoint(s) 162, storage space in any of the media streaming system's 110 data stores, and the like, to the content stream. In various embodiments, any or all of the allocated components may remain allocated to the content stream as needed (e.g., for the duration of an incoming live stream). Alternatively, components may be allocated only if needed, and released when no longer needed. For example, the control system 112 may dynamically scale up and down the number of origin servers 120 allocated for delivery of the content stream, based on the number or network location of end user devices requesting the content stream.

An origin server 120 may include physical and/or virtualized computing resources, including processors, memory, data storage devices, stored data and software programs, and other typical computer components, that enable packaging and distribution of encoded media streams in accordance with the present disclosure. In some embodiments, an origin server 120 includes one or more ingest devices 122, one or more egress devices 124, and one or more network interfaces 160, as described herein. An origin server may also have one or more security policies and other security tools that restrict access to the origin server and its streams and other data. An origin server can be a virtual computing resource, or a collection thereof, and can be instantiated within a virtual computing environment provided by a computer resource service provider. For example, an origin server instance may be a virtual machine instance with an operating system and a network stack, and with one or more virtual network interfaces attached to enable the origin server instance to communicate on internal and/or external computer networks.

The control system 112 may include an origin server control module 114 that manages the provision of origin servers 120 in response to changing demands on the media streaming system 110, changing network conditions, modifications to existing origin server 120 configurations, or additions of new origin server 120 configurations. The origin server control module 114 may allocate and deploy new origin servers 120 (e.g., physical servers or virtual machine instances) in response to commands (i.e., from the programming interface 126) or triggering events. In some embodiments, the origin server control module 114 may store (i.e., in memory) an origin server inventory describing the origin servers 120 currently executing. The inventory may include the origin server capacity determined by a capacity testing system 130 as described herein; the origin server control module 114 may be configured to launch a new origin server 120 or allocate additional resources to an existing origin server 120 if the load on the existing origin server 120 reaches or approaches (e.g., within 10% of) the capacity.

The origin server control module 114 may further be configured to request a capacity test of a newly created or newly updated origin server 120 before the origin server is enabled to receive connections from user devices. In one embodiment, the origin server control module 114 may deploy such an origin server 120 into the media streaming system 110 so that a capacity testing system 130 can connect to the origin server 120 over the external computer network 106 and stream data from the origin server 120 under normal operating conditions; any connections requested by computing devices not associated with the capacity testing system 130 may be denied. In one example, the origin server control module 114 may deploy the origin server 120 with a security policy attached which allows only load generators 138A,B, . . . N of the capacity testing system 130 to connect to the origin server 120. Once the capacity test is complete, the origin server control module 114 may change or remove the security policy so that the origin server 120 can receive connections from appropriate requesting devices.

An ingest device 122 may receive a raw or encoded media stream from a media source 104, the control system 112, or a content stream data store 184, and may add and/or modify configuration parameters of the media stream to produce a plurality of encoded media streams that are configured for delivery via one or more protocols. For example, the ingest device 122 may repackage a live stream into a different transport protocol packaging standard, add digital rights management attributes to the live stream (e.g., attributes that restrict access to, modification of, and/or distribution of the live stream), inject other content such as advertisements into the stream, make copies that stream at lower resolutions or bit rates, integrate video-on-demand features such as pause and rewind, and the like. In various embodiments of producing a packaged encoded media stream, the ingest device 122 may process the content stream provided to the media streaming system 110 as a feed from a media source 104, or may retrieve and process a previously stored encoded media stream or other media file from the content stream data store 184, or may aggregate a plurality of data segments and/or content streams and package the aggregated data as a single encoded media stream. The ingest device 122 may deliver metadata describing the encoded media stream, or the encoded media stream itself, to the control system 112 for provisioning of a delivery channel as described below.

An egress device 124 can receive the encoded media stream from the ingest device 122 and prepare the encoded media stream and/or metadata for distribution to end user devices. For example, the egress device 124 may determine that the delivery protocol is APPLE HLS and may divide the media stream into segments of equal length and store the segments as segment files. The egress device 124 may further create a file manifest that is delivered (e.g., as metadata) to a requesting device; the requesting device uses the manifest to request the next segment file in the sequence at the appropriate time. The egress device 124 may deliver the packaged encoded media streams to one or more network interfaces 160 that connect to an external (i.e., outside the system) computer network. In another example, the egress device may cooperate with other computing resources, such as load balancers and routers, to deliver the streams to (a) corresponding network interface(s).

A network interface 160 provides one or more endpoints 162 that each receive a content stream from one or more egress devices 124 and can receive connections from one or more user devices over the external computer network 106. Each endpoint 162 can be assigned an internet protocol (IP) address by the network interface 160; the IP address may expose the endpoint 162 to user devices, either directly (i.e., a "public" IP address that can be typed into a browser address bar on a user device) or through a router or load balancer that can identify incoming connections and determine the appropriate endpoint 162 for the requesting device. An endpoint 162 may have a configuration 164 identifying device parameters (e.g., device type, browser type and version, media player parameters) of devices that it is configured to serve, acceptable packaging protocols and/or encoding configurations, bitrates, encryption schemes, and enablement of various services and interactive features, such as catch-up television, just-in-time packaging, time-shifting of content, and the like. The configuration 164 may further identify the channel 150 to which the endpoint 162 is coupled.

In some embodiments, the control system 112 may include a channel provisioning module 116 that executes program instructions to create a channel 150 for the encoded media stream. A "channel" may be a data structure or configuration that is dedicated to delivering an encoded media stream 152 from, e.g., its egress device 124 to the network interface 160. The channel 150 may be configured with details on how the encoded stream will be distributed to end user devices (e.g., duration of the stream, bitrates available to end user devices, which devices can access the live stream, distribution format, etc.). A channel 150 connects in the network interface 160 to an endpoint 162 that is provisioned by the network interface 160 and has a desired configuration 164. Each endpoint 162 may be coupled to one channel 150, though each channel 150 may have multiple endpoints 162 coupled thereto.

The control system 112 may further include an event handling module 118 executing program instructions for receiving, responding to, and sending event messages between other services in the computing environment 100. In some embodiments, the event handling module 118 may receive event messages that trigger control operations of the origin server control module 114. For example, the event handling module 118 may receive an event message from a capacity testing system 130 indicating that a capacity test of an origin server 120 is complete; such an event message may contain the newly determined capacity value (e.g., in number of concurrently connected users), and the origin server control module 114 may receive the event message and extract and store the capacity value. In another example, the origin server control module 114 may, before deploying a newly create or updated origin server 120 for the first time, invoke the event handling module 118 to send an event message to the capacity testing system 130 requesting a capacity test against the origin server 120 before it is enabled for streaming to user devices.

The media streaming system 110 (and each of the components therein) may include one or more processors, memory that stores instructions executed by the one or more processors, network interfaces, application-specific hardware, or other hardware components that allow the system 110 to perform the functionality described herein. While a single media streaming system 110 is illustrated in FIG. 1, this is not meant to be limiting. The computing environment 100 may include any number of media streaming systems 110, some or all of which can be accessed via the network 106. The network 106 may be a publicly accessible network of linked networks, possibly operated by various distinct parties, such as the Internet. In other embodiments, the network 106 may include a private network, personal area network, local area network, wide area network, cable network, satellite network, cellular telephone network, etc. or combination thereof, each with access to or from the Internet. It will further be appreciated that the example of FIG. 1 has been simplified for the purposes of explanation, and that the number and organization of components in the origin server 120 and/or media streaming system 110 may be much larger or smaller than what is depicted in FIG. 1. For example, the media streaming system 110 may include a plurality of origin servers 120, and/or one or more load balancers to serve as an interface between the origin servers 120 and the external computer network 106. As another example, the media streaming system 110 can include a CDN incorporating nodes that reference endpoints in the network interface 160 to facilitate the delivery of the content streams to one or more end user devices in geographically disparate locations.

A capacity testing system 130 of the present disclosure may receive messages, such as requests or event messages, to perform capacity testing of a media streaming system 110 or of one or more origin servers 120 thereof. In some embodiments, such messages may be received by a frontend 132, which may be computing hardware and/or software configured to communicate with computing devices outside of the capacity testing system 130 and relay instructions and other data to internal system components. The frontend 132 may receive messages generated by triggering events, which may in some cases be sent by the event handling module 118 of the control system 112, such as when a newly created or newly reconfigured origin server 120 must have its capacity determined before it begins to stream content to user devices. An event handling module 134 of the frontend 132 may process such messages as described above. Additionally, the frontend 132 may connect to the programming interface 126 to receive capacity test parameters, settings, and other user input from an administrator of the capacity testing system 130. In some embodiments, the administrator may also be the administrator of the media streaming system 110, such as when the administrator is a customer of a computing resource service provider that provides both a streaming service and a capacity testing service to its customers. Further, the frontend 132 and/or the event handling module 134 may send messages and data to computing devices, such as capacity test results to the control system 112 and/or the administrator.

The capacity testing system 130 may include a load control system 136 that receives an instruction to execute a capacity test against an origin server 120. In response to the instruction, the load control system 136 may obtain (e.g., from a load generator data store 146) a configuration for one or more load generators 138A-N to be deployed for use in the capacity test. In some embodiments, a load generator data store 146 may contain one or more load generator configurations. In one embodiment, a configuration may be a template comprising virtual resource definitions that the load control system 136 uses to allocate virtual computing resources. In another embodiment, a configuration may be a machine image, such as a virtual machine image for launching load generators as virtual machine instances, or a container image for launching load generators as container instances within a virtual machine instance. Some embodiments of a capacity test may require only one configuration of a load generator that can be executed against any origin server 120 having any parameters; in other embodiments, the load generator data store 146 may store multiple configurations that accommodate different streams or streaming environments, as described further below. The load control system 136 may thus receive certain test parameters along with an identifier or address (e.g., IP address of the endpoint 162) of the target origin server 120. In some embodiments, the parameters may include information for configuring (or selecting a configuration of) a load generator to be compatible with the encoded media stream 152 that the origin server 120 provides.

The load control system 136 may deploy load generator instances 138A-N having a selected configuration into a virtual computing environment, and may manage the load generator instances 138A-N while they are executing and de-provision them (i.e., release their virtual resources) when they are no longer needed. The load control system 136 may maintain an instance inventory that includes at least a count of the active load generator instances 138A-N, and may further include identifying information and other parameters of each load generator instance 138A-N. The load control system 136 may be communicatively connected to a signaling system 174 as described further below, and may receive signals therefrom. The load control system 136 may determine whether a signal from the signaling system 174 is instructing the load control system 136 to increase the load on the origin server 120 by deploying another load generator instance, decrease the load by disconnecting a connected load generator instance, or terminate the capacity test by disconnecting all load generator instances, releasing their virtual resources, and calculating and reporting the determined capacity. In some embodiments, each load generator instance 138A-N represents a defined number of user devices streaming from the origin server 120, and the capacity of the origin server 120 may be calculated by multiplying the defined number by the number of load generator instances 138A-N executing when the capacity test is ended.

In some embodiments, a load generator instance 138A may include computing hardware and/or software for emulating, to a target origin server 120, one or more connected user devices each streaming one or more of the origin server's 120 encoded media streams. The load generator instance 138A may include or connect to a physical or virtual network interface that enables the load generator instance 138A to connect to the external computing network 106. For example, the load generator instance 138A may be assigned a public IP address from which to send messages to the origin server 120 over the network 106. The load generator instance 138A may include a streaming module 140 that configures the load generator instance 138A to stream one or more encoded media streams from the origin server 120. For example, the load generator instance 138A may request and receive one encoded media stream 152, or multiple streams of the same encoded media stream 152, or multiple different encoded media streams including the encoded media stream 152. The load generator instance 138A may receive multiple streams simultaneously, and multiple streams may be synchronized or staggered. The streaming module 140, the load generator instance 138A, or the virtual network interface of the load generator instance 138A may record data describing the network communications, for use in calculating metrics as described further below.

As described above, a streaming connection of one user device imparts a measurable load on the origin server 120; as the number of user devices increases, the load increases, and once the load exceeds the capacity of the origin server 120, streaming performance degrades. Presently, variations of a typical origin server 120 that is a physical computing device, or is a virtual computing device in a non-scaling cloud environment, can accommodate around 1500 concurrently streaming user devices; virtual origin servers in scaling or highly distributed environments can handle many more. The present disclosure considers one active stream to represent one connected user device. Some embodiments of the load control system 136 may launch one load generator instance 138A-N per simulated user and yet can be computationally efficient. For example, all load generator instances 138A-N may be container instances executing in a small number of virtual machine instances, as described further below. A container instance may be assigned sufficiently minimal computing resources so as not to unnecessarily consume resources, in comparison to launching one virtual machine instance to represent each connected user device. In the illustrated embodiment, the streaming module 140 may configure the load generator instance 138A (which is a virtual machine instance) to establish a set of concurrent streams by sending stream requests to the origin server 120 at a rate that is greater than necessary to maintain a single stream, causing the origin server 120 to initiate and maintain multiple streams to the load generator instance 138A. Examples of suitable streaming connections and request rates are described further below.

In addition to receiving multiple streams from the origin server 120, the load generator instance 138A may process the received stream data. In one embodiment, the streaming module 140 may configure the load generator instance 138A to perform certain processing actions that maintain a successful emulation of multiple connected user devices. In some embodiments, the streaming module 140 may simulate playback of each stream in order to continue making correct streaming requests to the origin server 120. For example, where the encoded media stream 152 is divided into segments, the streaming module 140 may receive a manifest of the segment files, and use the manifest to request the next sequential segment file from the origin server 120 in order to keep the stream active. Additionally or alternatively, the streaming module 140 may simulate playback functions, such as decoding the encoded media stream, in order to perform error checking of the received stream data; the streaming module 140 may record errors and/or normal playback to facilitate metric tracking, as described further below.

A load generator instance 138A-N may further include a monitoring module 142 comprising program instructions that configure the corresponding load generator instance 138A-N to collect and/or report monitoring data describing the load generator instance's streaming connection to the origin server 120. Monitoring data may include network activity information, such as the number of connections made, volume of data transferred, dropped packets, number of HTTP processing errors, and the like. For example, the monitoring data may include a count of, and/or detailed information such as a timestamp or data packet information about, HTTP response status codes (e.g., having code numbers in the range of 400-499, indicating an apparent client-side error, or in the range of 500-599, indicating the server failed to fulfill the request) received by the load generator instance in response to the instance's request for the stream of encoded media. Monitoring data may also include stream processing information, such as stream data errors, decoding errors, synchronizing errors, and the like. The monitoring module 142 may collect the monitoring data, or may cause the data to be collected or recorded by other components, such as the streaming module 140 and/or one or more network interfaces. In some embodiments, the monitoring module may obtain raw reporting data and convert the raw data into monitoring data. For example, the streaming module 140 may send system messages to an operating system of the load generator instance 138A, and the monitoring module 142 may read all of the system message and copy any system messages that contain stream error information. In another example, the monitoring module 142 may be configured to monitor particular metrics describing the performance of the origin server 120, and may collect only monitoring data pertaining to those performance metrics. For example, the performance metrics may be selected to be representative of a predefined quality of service level associated with the stream delivered by the origin server 120, as described herein. The monitoring module 142 may produce one or more activity logs describing streaming performance data, and send them to a performance data storage system 170 continuously or at a predetermined interval. In this manner, each of the load generator instances may generate and transmit a stream of corresponding monitoring data to the performance data storage system 170.

A performance data storage system 170 may be a component of the capacity testing system 130, or may be an external component implemented in the computing architecture of the computing environment 100. For example, the performance data storage system 170 may be a logging system of a computing resource service provider. The performance data storage system 170 may receive monitoring data, such as activity logs, from each of the load generator instances 138A-N that are executing against the origin server 120. In some embodiments, the performance data storage system 170 may receive or obtain a monitoring data stream comprising the corresponding monitoring data being streamed (e.g., sent continuously, such as in real-time responsive to recorded events) by each of the load generator instances. The performance data storage system 170 may store the received monitoring data in a performance data store 186 for later processing. Additionally or alternatively, the performance data storage system 170 may perform one or more data processing functions on the monitoring data. In some embodiments, the performance data storage system 170 may aggregate and normalize the monitoring data across all executing load generator instances 138A-N in order to obtain performance data representing a complete picture of the origin server's 120 streaming performance. For example, the performance data storage system 170 may transform a monitoring data stream into the performance data substantially in real time at the monitoring data stream is received. The performance data storage system 170 may in some embodiments aggregate the performance data obtained from the monitoring data over sequential time windows having a preset duration. For example, a monitoring data stream may be collected for the duration of a time window and transformed into time-separated performance data associated with the time window in which the monitoring data stream was generated. The performance data storage system 170 may index the time-separated performance data in sequence (i.e., according to a timestamp of the corresponding time window) in the performance data store 186 so that changes in the performance data can be correlated with increases or decreases in the number of allocated load generator instances 138A-N.

A signaling system 174 may be a component of the capacity testing system 130, or may be an external component implemented in the computing architecture of the computing environment 100. For example, the signaling system 174 may be an alerting system of a computing resource service provider. The signaling system 174 may include or access one or more sets of metric thresholds 188 that define measurements for the monitored performance metrics which correspond to an acceptable quality of service level of the streaming provided by an origin server to connected, streaming user devices. In one example, the set of metric thresholds 188 may be a lookup table or data structure containing metric-threshold value pairs. The threshold values may be set by an administrator of the system, or may be adopted from industry standards. The set of metric thresholds 188 may take into account the parameters of the encoded media stream 152 being streamed during the test. In some embodiments, where a test media stream or another single, known media stream is used, there may be only one set of metric thresholds 188. In other embodiments, the signaling system 174 or another component of the capacity testing system 130 may determine the parameters of the encoded media stream 152 and select, from multiple sets, the corresponding set of metric thresholds 188.

The signaling system 174 may obtain performance data from the performance data store 186 and compare the threshold value of each metric to the stored, collected value of the corresponding metric in the performance data. In some embodiments, the signaling system 174 may perform this comparison once per pre-defined time window (e.g., of about 10 seconds, or 30 seconds, or one minute or more) by retrieving the performance data record at the most recent index. The signaling system 174 may determine from the comparison whether any of the performance metrics breached the corresponding threshold value during the corresponding time window. In accordance with a signaling algorithm, examples of which are described below, the signaling system 174 may send a signal to the load control system 136 based on the comparison of the stored metric values to the threshold values. If certain breach conditions exist, indicating the origin server 120 is exhibiting degraded performance, the signaling system 174 may signal the load control system 136 to "scale down" the load on the origin server 120 (i.e., by disconnecting a load generator instance 138A-N. If no breach has occurred for a predetermined duration, the signaling system 174 may signal the load control system 136 to "scale up" the load on the origin server 120 (i.e., by deploying and connecting another load generator instance 138A-N). If a desired test duration has been reached, indicated, for example, by the number of indexed performance data records, the signaling system 174 may signal the load control system 136 to stop the capacity test.

Figure 2A:
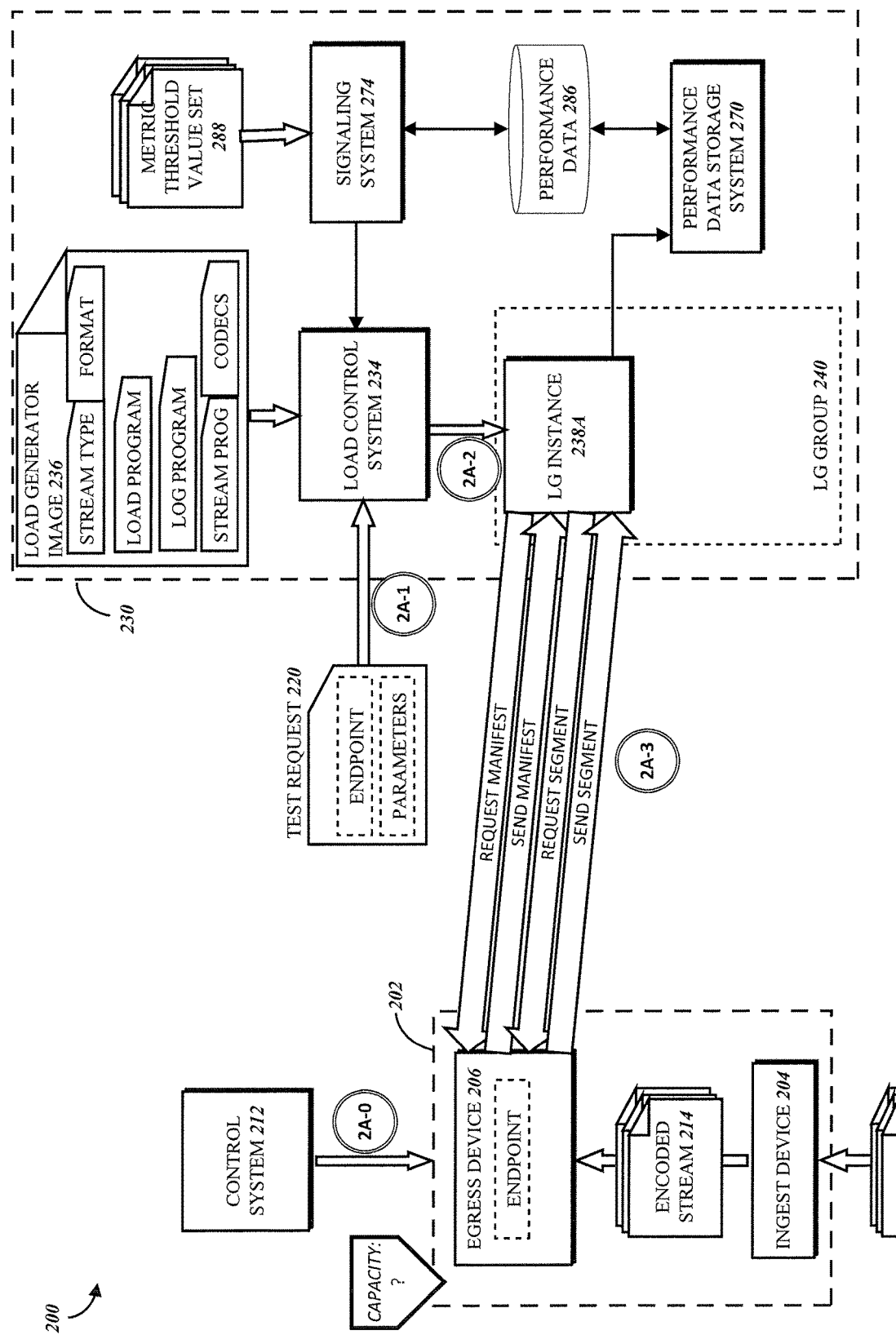
FIGS. 2A-E are sequential block diagrams of a capacity testing system as in FIG. 1, showing various states of applying a load to an origin server in accordance with the present disclosure.

Referring to FIGS. 2A-E, an example computing environment 200 as in FIG. 1 is simplified to illustrate the data flows between a capacity testing system 230, as described above with respect to element 130 of FIG. 1, and a target origin server 202 such as the origin server 120 of FIG. 1, during various stages of an example capacity test. Referring to FIG. 2A, stage 2A-0 reflects a control system 212 of a media streaming system deploying or updating the origin server 202 or components thereof. This deployment may be a triggering event that sends a capacity test request 220 to the capacity testing system 230, or the deployment may itself be triggered by the event that triggers the capacity test request 220; for example, an administrator may send a command to both systems 212, 230 to deploy the origin server 202 and test its capacity. The origin server 202 may be prepared to serve an encoded media stream 214. For example, an ingest device 204 may receive and encode a media stream 210 to produce the encoded stream 214 and deliver it to an egress device 206; the egress device 206 may be connected to an endpoint that is then shared with the capacity testing system 230.

Stage 2A-1 reflects the beginning of the capacity test, where a load control system 234 receives the test request 220. The test request 220 may identify the endpoint attached to the target origin server 202, and in some embodiments may further include various parameters related to the capacity test. For example, the parameters may include a duration, a starting load, a set of performance metrics to test and their corresponding metric threshold values, and other test parameters. In another example, the parameters may describe the encoded media stream 214, such as the format, codec used, bitrate, etc., and/or may describe the origin server 202, such as the type, processing power, or previously calculated capacity. The load control system 234 may retrieve a load generator image 236 (e.g., from the load generator data store 146 of FIG. 1), which may in some embodiment require comparing the received test parameters to properties of the stored load generator images to select the correct load generator image 236. Optionally at this stage, a signaling system 274 may determine the appropriate set of metric threshold values 288 to use in evaluating the performance metrics as described above. Data for making this determination may be included in the test request 220 (e.g., stream parameters) and/or in the selection of load generator image 236 (e.g., stream type and format).

A load generator image 236 may include one or more programs, or references to locations of software objects for one or more programs, which may each be an executable script, collection of scripts, source code, or executable file that, when executed, cause a load generator instance to perform one or more tasks associated with the capacity test. In some embodiments, the programs may include a load program that causes a load generator instance to perform one or more tasks that create a load on the target origin server 202. For example, the load program may be a script that causes the load generator instance to request the stream 214 from the target origin server 202 at a predetermined rate (e.g., in number of requests per second). The load program may further cause the load generator instance to record (i.e., in a log as monitoring data) results of the requests, such as a successful connection, error message, dropped packets, latency/time to response, etc. Additionally or alternatively, the programs may include a logging program that causes the load generator instance to collect system messages, notifications, network activity data, and the like, and extracts and records (e.g., into log files or log streams) monitoring data associated with the performance metrics being tracked. The logging program may further send the logs to a performance data storage system 270 or a performance data store 286 as described further below.

A streaming program may be a general media player, such as Quicktime Player or Windows Media Player, or may be a specially configured media playback program for use in the capacity test. For example, the streaming program may decode (i.e., using the correct codec(s)) the stream 214 in order to check the stream 214 for errors or other undesired stream characteristics that can be caused during packaging or transmission and may reflect unsatisfactory performance of the target origin server 202. Non-limiting examples of such errors include missing data blocks, demultiplexing and resynchronization errors, scrambled or misformatted data, delivery of a variant having a lower resolution or bitrate than the original stream 214, latency that causes a buffer or cache to empty, and other problems. The streaming program may perform decoding, synchronization, and other typical media player processes, and in some embodiments may stop processing the stream 214 when the decoded stream is ready to be displayed. That is, the streaming program may simulate but not actually perform playback. Additionally, the streaming program may generate messages, such as system messages or messages to the logging program, recording each step of its process or alternatively only identified errors.

The load control system 234 then uses the load generator image 236 to allocate and deploy a load generator instance 238A configured to request and process the encoded media stream 214, reflected at stage 2A-2. In some embodiments, the load control system 234 may create a load generator group 240 associated with the capacity test of the target origin server 202, and may launch the load generator instance 238A and other load generator instances associated with the capacity test into the load generator group 240. For example, the load control system 234 may create a data structure in memory to track which instances are in the group 240, or may create the load generator instances to include a group identifier for the group 240 in metadata.

The load control system 234 may provision a virtual network interface to the load generator instance 238A, or the load generator instance 238A may include a virtual network interface or may connect to a physical network interface of an underlying hardware computing device. In any case, the load generator instance 238A connects to a computer network that it can use to reach the origin server 202. The first load generator instance 238A may then establish a connection to the endpoint associated with the egress device 206 of the origin server 202, at stage 2A-3. For example, the load generator instance 238A sends a message including a request to receive the stream 214; the origin server 202 or its network interface may check the request against a security policy for the origin server 202 (which at this point is publicly hidden) and sends back a message accepting the connection and including the manifest of the sequential files that comprise the stream 214. In another example, establishing the connection may include successfully sending a first pair of requests and receiving transmitted data from the origin server 202 in response; the first request may be a request for the manifest of the stream 214, with the response being the manifest (e.g., in an XML file), and the second request may be a request for the first segment of the stream 214, as identified from the manifest, with the response being the first segment file.

Figure 2B:
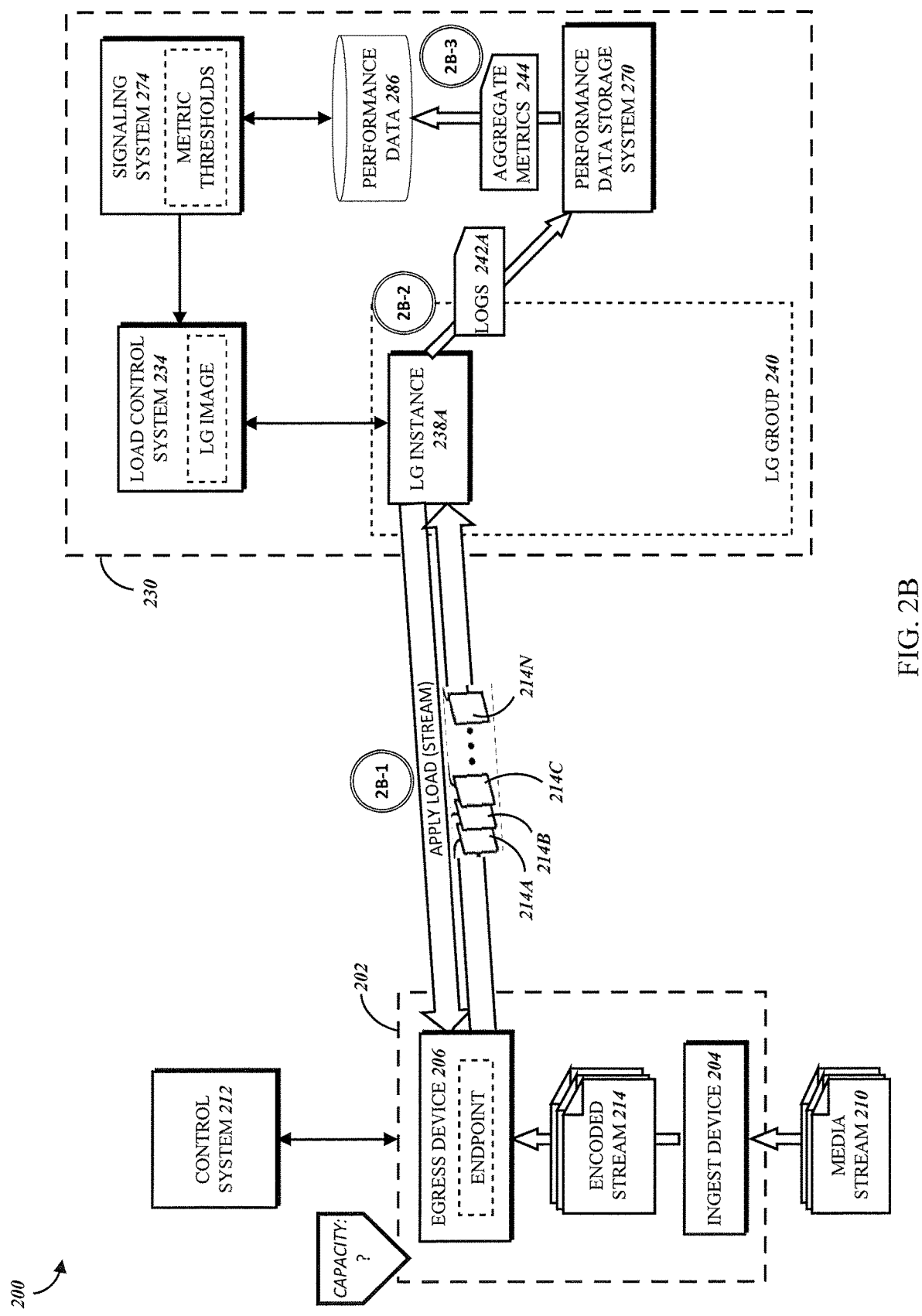

Referring to FIG. 2B, at stage 2B-1 the load generator instance 238A applies a load to the target origin server 202 by establishing a plurality of streams. In some embodiments, the load from the single load generator instance 238A may appear to the target origin server 202 to be composed of multiple requesting devices. To wit, where the encoded media stream 214 is divided into segments 214A,B,C, . . . N of equal length, a typical connected user device streams from the origin server 202 using "segment requests" that comprise two rapid message exchanges—a request for the manifest by the user device, with a response from the server with the manifest; and a request for the next needed segment 214-A-N, with a response of multiple packets comprising the requested segment. So, the model user device sends a segment request, begins receiving a first segment 214A, then sends a second request for a second segment 214B, before the first segment is finished playing, and so on through the manifest until the last segment 214N is requested. Generally, a single user device's segment requests (technically containing two request messages from the user device, at most about 100 ms apart) are spaced at about the length of the segment; the origin server 202 maintains the stream as long as the user device is requesting the correct next segment in time.

With this context in mind, in one example a single load generator instance 238A emulates a plurality of connected user devices as follows: the load generator instance 238A requests the first segment 214A repeatedly for a duration from time T1 to time T2 that is approximately the length of the segment; as the egress device 206 responds to each segment request by sending the first segment 214A to the load generator instance 238A, a number of streams from the target origin server 202 equal to the number of segment requests is established; at time T2 the load generator instance 238A begins repeatedly requesting the second segment 214B for the same duration, to time T3, such that the load generator instance 238A makes the same number of segment requests for the first and second segments and the origin server 202 continues to serve all of the established streams. The segment requests for the third segment 214C from time T3 to time T4 follow this pattern, and so on until the last segment 214N is requested, the load generator instance 238A is disconnected, or the capacity test ends. The load generator instance 238A may further start a new stream, beginning with the first segment 214A, each time one of the concurrent streams ends, if the capacity test is to continue.

In this example, the load generator instance 238A may be configured to send individual messages at a request rate, which may be measured in number of requests per second. In some embodiments, the request rate may be predetermined, in accordance with a usage policy or a limitation of one or more components. For example, a logging program or a performance data storage system 270 may have technical or usage limits that set a maximum number of messages per second that can be logged. In some embodiments, a request rate may be stored in the load generator image, or in the load program, or in memory of the load control system 234. In another embodiment, the request rate may be one of the parameters of the test request message. In another embodiment, the request rate may be based on parameters of the origin server 202 or of various networking components disposed between the origin server 202 and the load generator instance 238A. For example, the origin server 202 or another component may indicate to the load generator instance 238A (e.g., within metadata of a message) that the load generator instance 23A is limited a maximum number of transactions per second.

Where the request rate and the stream segment length are fixed and known, the number of concurrently connected user devices represented by the load (i.e., the rate of data transfer from the origin server 202 to the load generator instance 238A) of a single load generator instance 238A can be calculated. For example, if the request rate is 50 messages per second, the load generator instance 238A can send 25 segment requests establishing 25 concurrent streams to 25 emulated user devices per second. If the segment length is six seconds, the load generator instance 238A is establishing new streams by requesting the first segment for the first six seconds of the operation, before moving to the second segment. Thus, the load generator instance 238A represents up to 150 connected user devices. In addition to receiving the set of 150 concurrent streams, the load generator instance 238A also performs the stream 214 processing as described above. For example, each time the load generator instance 238A receives the first segment 214A, the load generator instance 238A decodes the first segment 214A, performs error checking on the decoded content, and records any errors for that particular delivery (of 150) of the first segment 214A.

While the load generator instance 238A spins up and applies the load, it may at stage 2B-2 begin generating logs 242A of monitoring data, as described above, and sending the monitoring data to the performance data storage system 270. The load generator instance 238A may continuously send logs 242A to the performance data storage system 270, or may do so at an interval, such as at the end of each time window of a predetermined length. The logs 242A may be generated by the load generator instance 238A and/or by components thereof, or other components such as a network interface or API that receives traffic, function calls, etc., made or received by the load generator instance 238A. The performance data storage system 270 may receive the logs 242A and begin to generate aggregate metrics 244 describing the performance of the origin server 202 continuously or across one or more time windows. This may include extracting relevant data from the logs 242A to determine current and/or aggregate values for desired performance metrics. For example, the performance data storage system 270 may be configured to extract, from the logs 242A, monitoring data entries containing information relevant to the quality of service level of the stream. In a particular example, a performance metric is stream latency, defined by the amount of time it takes for the load generator instance 238A to receive a response to a request for a stream of encoded media; the performance data storage system 270 may identify each pair of monitoring data entries in the logs 242A that describe a request sent and a response received, determine the timestamps of the request and response, calculate the latency for each pair of entries, and then average the calculated latencies to determine the actual (average) latency. The performance data storage system 270 may store the aggregate metrics 244 in the performance data store 286, at stage 2-3, at a desired frequency. For example, the performance data storage system 270 may index the aggregate metrics 244 for each time window and store the aggregate metrics 244 before beginning to calculate the aggregate metrics for the next time window.

Figure 2C:
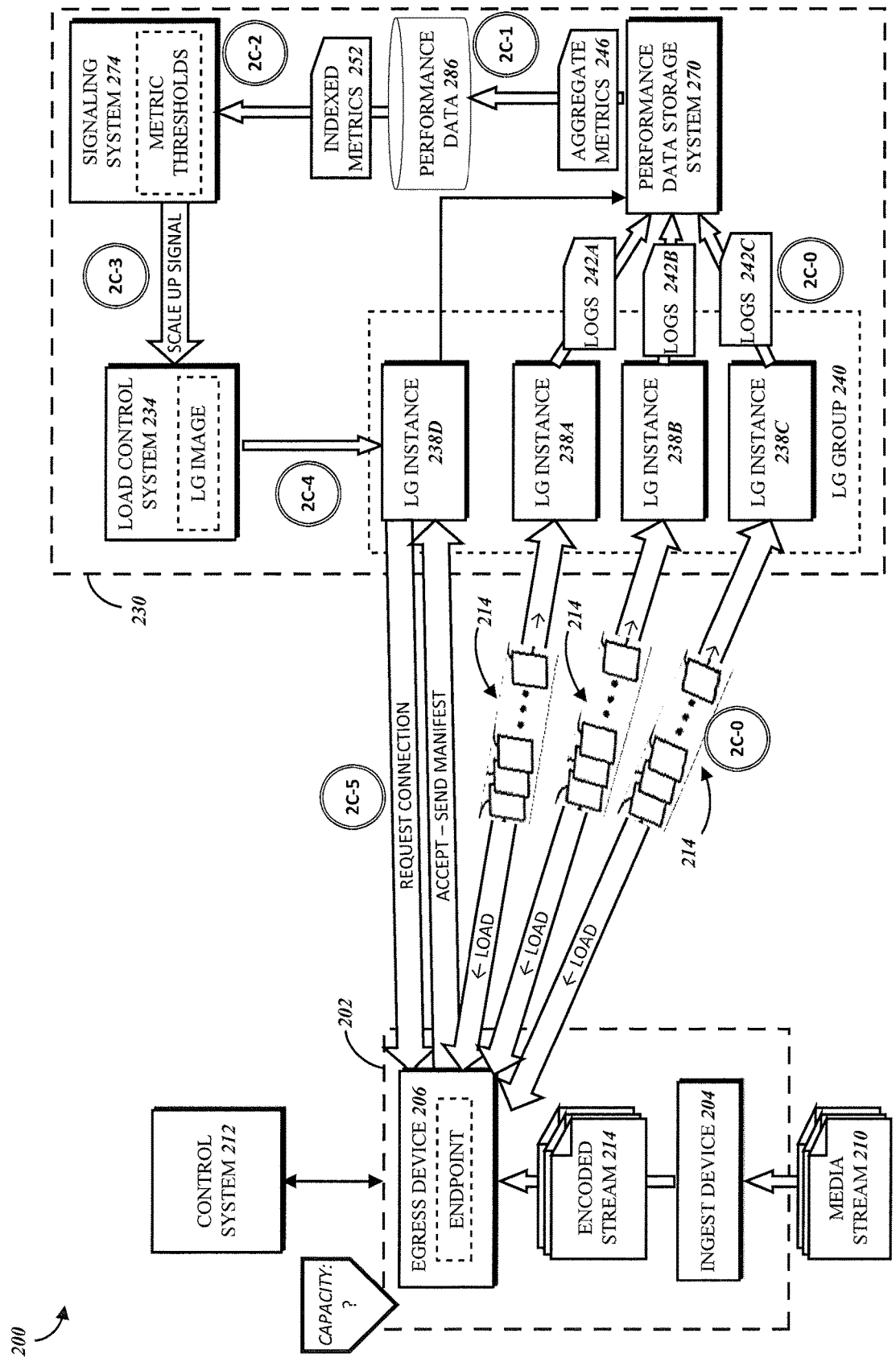

FIG. 2C demonstrates stages of scaling up the load on the origin server 202; relative to FIG. 2B, the state of the system has progressed such that the load control system 234 has deployed additional load generator instances 238B, C to the load generator group 240 and, at stage 2C-0, three load generator instances 238A-C are receiving the stream 214 and sending logs 242A,B,C to the performance data storage system 270. Using the above example request rate and stream segment length, the origin server 202 is now serving 150 concurrent streams to each of the load generator instances 238A-C, representing 450 concurrently connected user devices, and at stage 2C-1, the performance data storage system 270 is storing aggregate metrics 246 that describe the quality of the streaming to all 450 user devices. At stage 2C-2, the signaling system 274 may query the performance data store 286 to obtain the metric values calculated for the most recent time window. The values may be obtained as an indexed record 252 of the calculated performance metrics.

The signaling system 274 may compare some or all of the received metric values against the threshold values of the desired set of performance metrics. If all values are within the threshold limits, or in some embodiments if no sustained breach of a threshold value (as described below) is detected, it indicates that the origin server 202 is still serving the stream 214 to all simulated connected user devices at or above an acceptable quality of service level, and thus the capacity of the origin server 202 has not been exceeded as of the most recent time window. After a predetermined number of consecutive time windows with these results, at stage 2C-3 the signaling system 274 may send a scale-up signal to the load control system 234. The scale-up signal may be a simple notification or other message that triggers the load control system 234 to increase the load on the origin server 202. Thus, at stage 2C-4, the load control system 234 may deploy a fourth load generator instance 238D to the load generator group 240, which instance 238D at stage 2C-5 connects to the origin server 202 as described above.

Figure 2D:
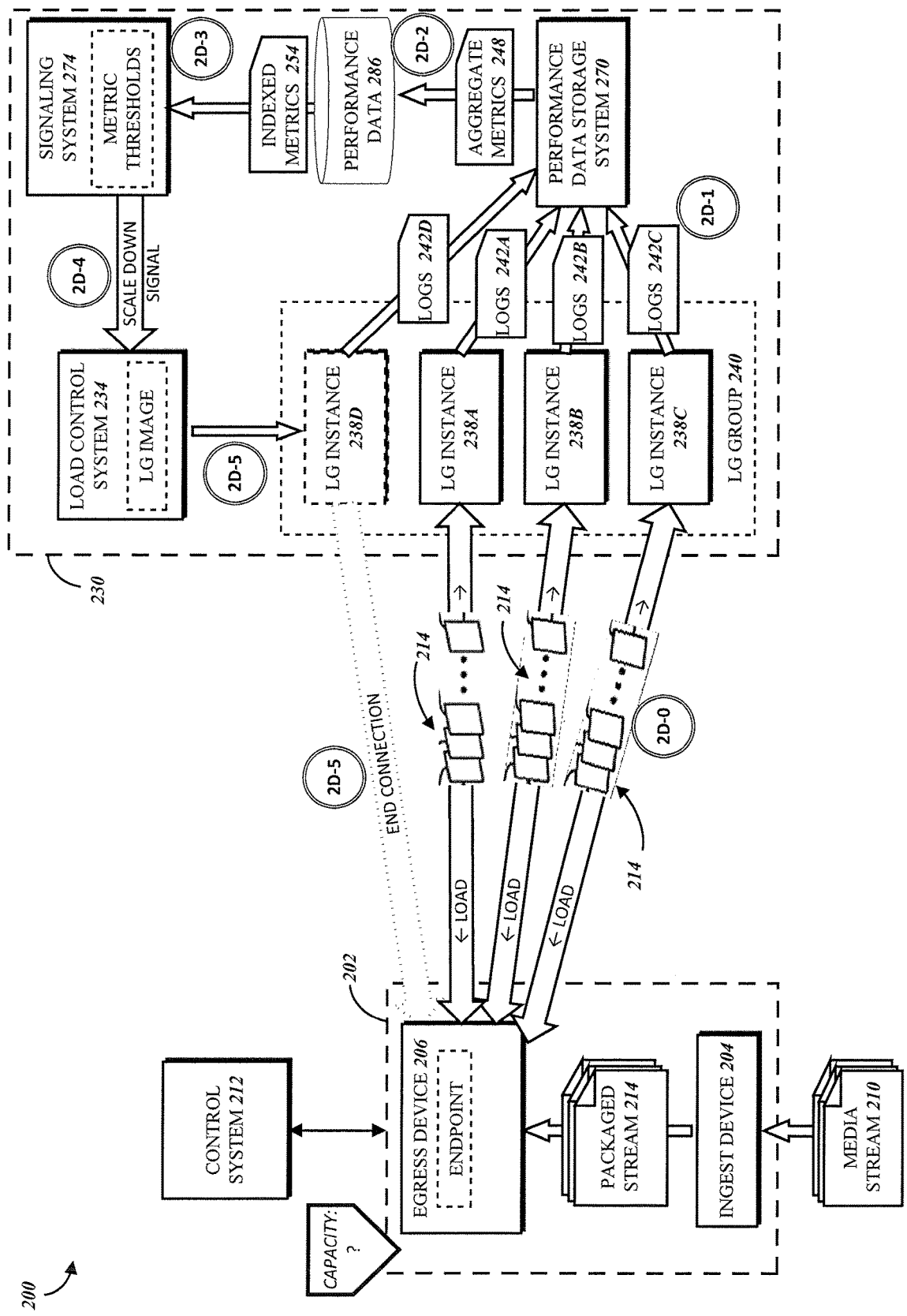

FIG. 2D demonstrates stages of scaling down the load on the origin server 202 after determining the capacity has been exceeded. Thus, at stage 2D-0 several load generator instances 238A-D are receiving the stream 214, and at stage 2D-1 report their logs 242A-D of the most recent time window of activity to the performance data system 270. The monitoring data is compiled into aggregate metrics 248 at stage 2D-2 and the corresponding indexed performance metrics 254 are delivered to the signaling system 274 at stage 2D-3, as described above. However, the signaling system 274 has been tracking a potential breach of the threshold value for one or more of the performance metrics over one or more previous time windows, and determines that the breach still exists and therefore has the properties of a sustained breach (in other embodiments, a single breach over one time window may be sufficiently "sustained"). At stage 2D-4, the signaling system 274 sends a scale-down signal to the load control system 234.

The load control system 234 responds to the scale-down signal by disconnecting, and in some embodiments further de-provisioning, one of the load generator instances 238A-D in the load generator group 240 associated with the origin server 202. The load control system 234 may select the newest load generator instance 238D, or the oldest load generator instance 238A, or may apply another suitable selection criteria to select the load generator instance to disconnect. At stage 2D-5, the load control system 234 instructs a load generator instance 238D to terminate its stream and disconnect from the origin server 202. The load control system 234 may further release the virtual resources allocated to the load generator instance 238D. Alternatively, the load control system 234 may disassociate the load generator instance 238D from the load generator group 240, but may otherwise hold the load generator instance 238D in a deployed state, to be quickly re-associated with the load generator group 240 or another group if needed.

Figure 2E:
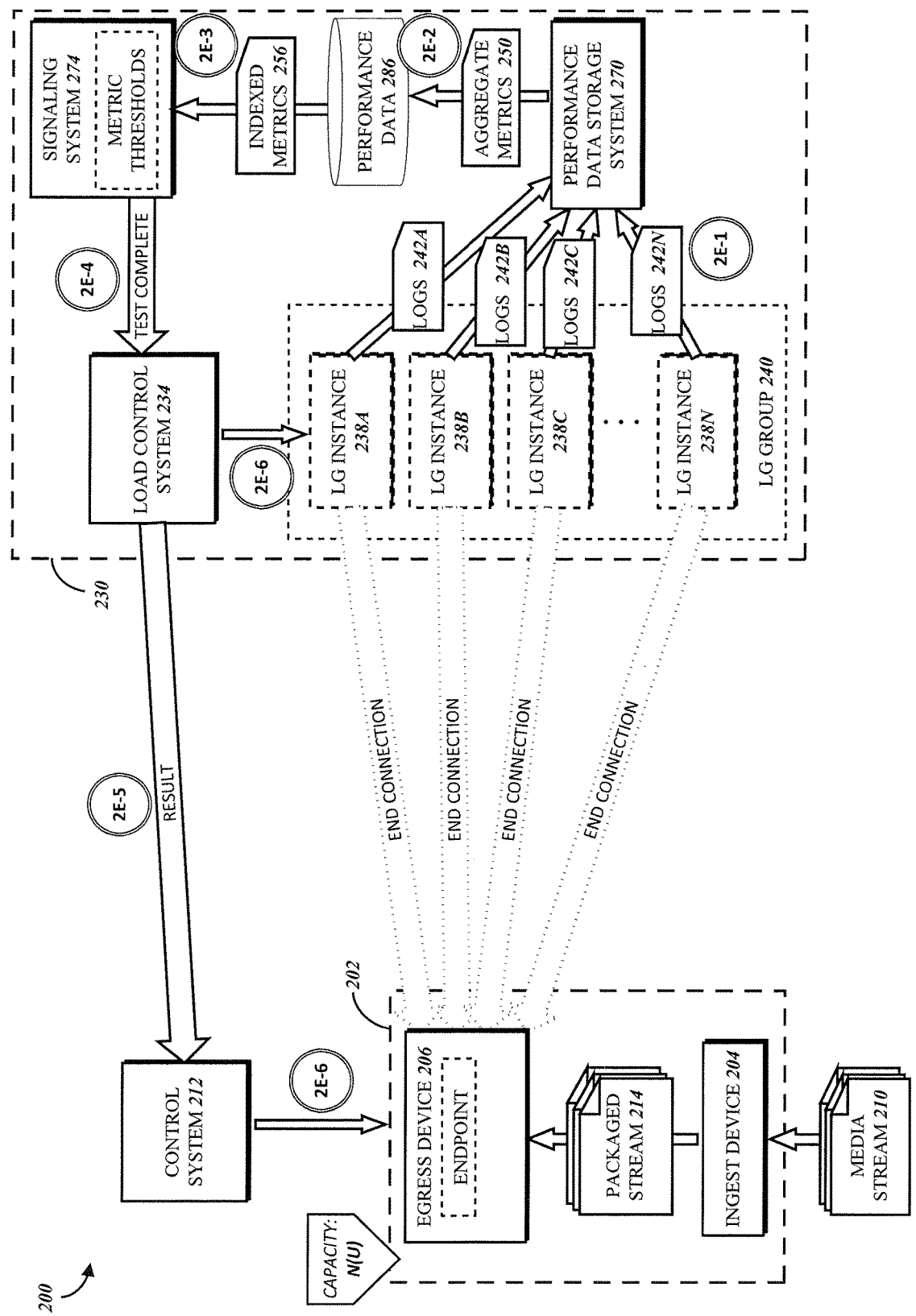

FIG. 2E illustrates one example approach to automatically ending a capacity test once a predetermined total number of time windows, or a predetermined number of time windows reflecting normal operation, have elapsed. It will be understood that the capacity test may alternatively be ended by a user input or another triggering event, in which case only stages 2E-5 and 2E-6 would occur. In the illustrated state, a plurality of load generator instances 238A,B,C, . . . N have been streaming from the origin server 202 and, at stage 2E-1, report the logs 242A,B,C, . . . N of the most recent time window of activity to the performance data storage system 270 as described above. Also as described above, aggregate metrics 250 are generated at stage 2E-2, and indexed metrics 256 are sent to the signaling system 274 at stage 2E-3. The signaling system 274 may determine that the desired number of time windows has elapsed, or may evaluate the performance metrics as described above to determine that the origin server 202 is still operating at the acceptable quality of service level, and at stage 2E-4 the signaling system 274 may signal to the load control system 234 to end the capacity test.

The load control system 234 may then calculate the estimated capacity N(U) of the origin server 202, based on the number of executing load generator instances 238A-N and the number of concurrently connected user devices each load generator instance 238A-N represents. At stage 2E-5, the load control system 234 may send the capacity value to the control system 212, which in turn may store the capacity value and/or report it to the origin server 202, at stage 2E-6. Concurrently, the load control system 234 may disconnect (i.e., terminate the streams of) and de-provision all of the load generator instances 238A-N as described above.

Figure 3:
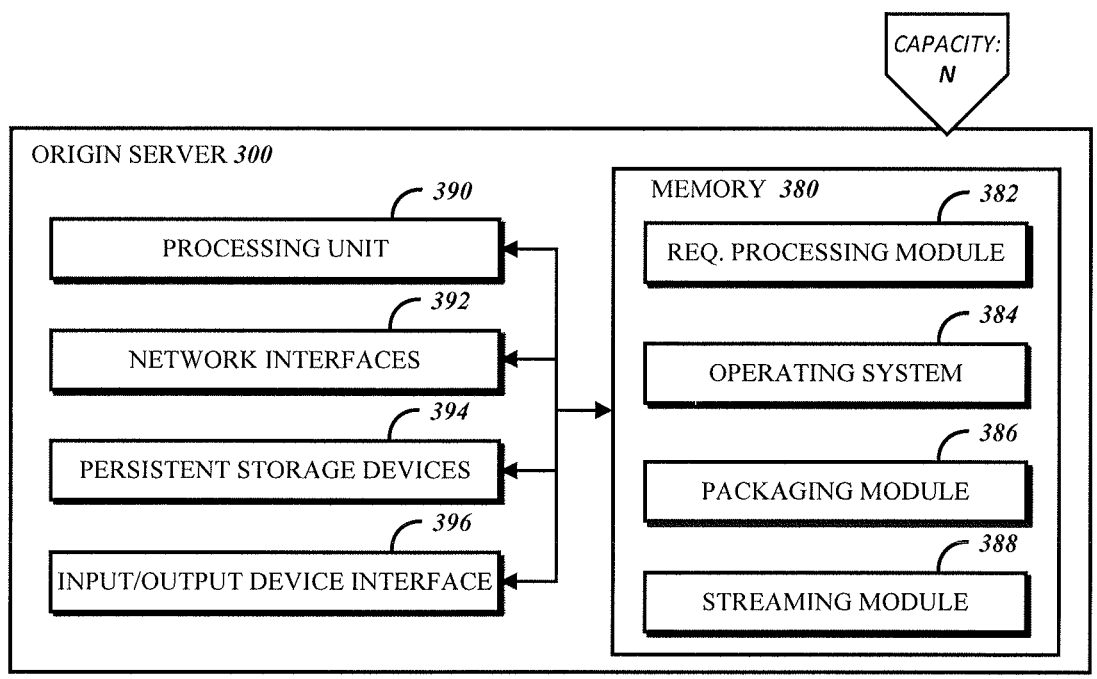
FIG. 3 is a block diagram of an example computing device architecture providing a hardware computing device for performing encoded media packaging and streaming in accordance with various embodiments of the present disclosure.

FIG. 3 depicts a general architecture of a computing system that can operate as an origin server 300 in the present systems. The general architecture of the origin server 300 depicted in FIG. 3 includes an arrangement of computer hardware and software modules that may be used to implement aspects of the present disclosure. The hardware modules may be implemented with physical electronic devices, as discussed in greater detail below. The origin server 300 may include many more (or fewer) elements than those shown in FIG. 3. It is not necessary, however, that all of these generally conventional elements be shown in order to provide an enabling disclosure. Additionally, the general architecture illustrated in FIG. 3 may be used to implement one or more of the other components illustrated in FIGS. 1 and/or 2A-E, such as a load control system or capacity testing system. As illustrated, the origin server 300 includes a processing unit 390, a network interface 392, a computer readable medium drive 394, and an input/output device interface 396, all of which may communicate with one another by way of a communication bus. The network interface 392 may provide connectivity to one or more networks or computing systems. The processing unit 390 may thus receive information and instructions from other computing systems or services via a connected network. The processing unit 390 may also communicate to and from memory 380 and further provide output information for an optional display (not shown) via the input/output device interface 396. The input/output device interface 396 may also accept input from an optional input device (not shown).

The memory 380 may contain computer program instructions (grouped as modules in some embodiments) that the processing unit 390 executes in order to implement one or more aspects of the present disclosure. The memory 380 generally includes RAM, ROM and/or other persistent, auxiliary or non-transitory computer-readable media. The memory 380 may store an operating system 384 that provides computer program instructions for use by the processing unit 390. The memory 380 may further include computer program instructions and other information for implementing aspects of the present disclosure. For example, in one embodiment, the memory 380 includes a request processing module 382 that receives, processes, and responds to requests for an encoded media stream that can be delivered by the origin server 300. In addition, the memory 380 may include and/or communicate with one or more data repositories (not shown), for example, to access user program codes and/or libraries.

In addition to, in combination with, and/or in lieu of the request processing module 382, the memory 380 may include a packaging module 386 and an endpoint control module 388 that may be executed by the processing unit 390. In one embodiment, the request processing module 382, packaging module 386, and streaming module 388 individually or collectively implement various aspects of the present disclosure, e.g., sending a plurality of streams to emulated user devices with at least an acceptable quality of service level, until a capacity associated with the available computing resources of the origin server 300 is reached.

Figure 4:
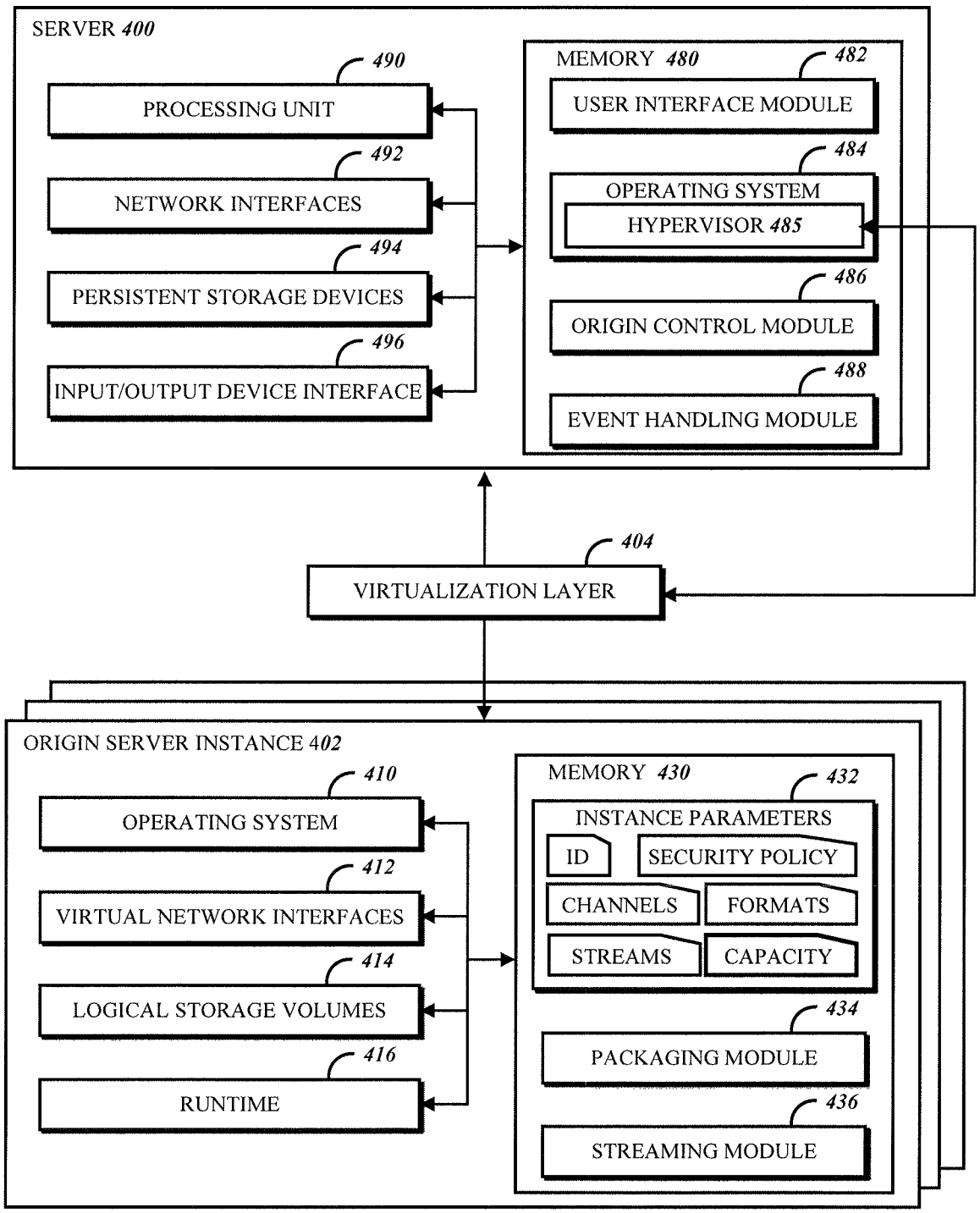
FIG. 4 is a block diagram of another example computing device architecture providing a hardware computing device and virtual computing resources for performing encoded media packaging and streaming in accordance with various embodiments of the present disclosure.

FIG. 4 depicts a general architecture of another computing system, referenced as server 400, that can operate in the present systems. The general architecture of the server 400 depicted in FIG. 4 includes an arrangement of computer hardware and software modules that may be used to implement aspects of the present disclosure. The hardware modules may be implemented with physical electronic devices, as discussed in greater detail below. The server 400 may include many more (or fewer) elements than those shown in FIG. 4, and further may be used to implement one or more of the other components illustrated in FIGS. 1 and/or 2A-E. As illustrated, the server 400 includes a processing unit 490, a network interface 492, a hard drive or other persistent storage device 494, and an input/output device interface 496, all of which may communicate with one another by way of a communication bus. The network interface 492 may provide connectivity to one or more networks or computing systems. The processing unit 490 may thus receive information and instructions from other computing systems or services via a connected network. The processing unit 490 may also communicate to and from memory 480 and further provide output information for an optional display (not shown) via the input/output device interface 496. The input/output device interface 496 may also accept input from an optional input device (not shown).

The memory 480 may contain computer program instructions (grouped as modules in some embodiments) that the processing unit 490 executes in order to implement one or more aspects of the present disclosure. The memory 480 generally includes RAM, ROM and/or other persistent, auxiliary or non-transitory computer-readable media. The memory 480 may store an operating system 484 that provides computer program instructions for use by the processing unit 490. The operating system 484 may include or communicate with a hypervisor 485, which is capable of providing a virtualization layer 404 of the server 400. The virtualization layer 404 enables the physical computing resources of the server 400, such as the processing unit 490, network interfaces 492, persistent storage devices 494, and/or memory 480, to be allocated to and accessed by virtual computing resources such as an origin server instance 402. The memory 480 may further include computer program instructions and other information for implementing aspects of the present disclosure. For example, in one embodiment, the memory 480 includes a user interface module 482 that provides graphical and other user interfaces to connecting devices and receives, processes, and responds to requests received through the user interfaces. In addition, the memory 480 may include and/or communicate with one or more data repositories (not shown), for example, to access user program codes and/or libraries.

In addition to, in combination with, and/or in lieu of the user interface module 482, the memory 480 may include an origin server control module 486 and an event handling module 488 that may be executed by the processing unit 490. In one embodiment, the user interface module 482, origin server control module 486, and event handling module 488 individually or collectively implement various aspects of the present disclosure, e.g., deploying one or more origin server instances 402, receiving a determined capacity of an origin server instance 402, and then enabling the origin server instance 402 to receive user device connections.

An origin server instance 402 hosted by the server 400 (i.e., in the virtualization layer 404) may operate similarly to an origin server 300 implemented as a physical server as described above. An operating system 410, virtual network interface 412, and logical storage volumes 414 may be allocated accordingly, and the origin server instance 402 may further include a runtime environment 416 in which software applications and other program instructions are executed. The origin server instance 402 may further include memory 430 containing parameters 432 of the instance, such as an instance identifier, a security policy for accessing the instance 402, metadata describing the channels and encoded media streams and formats thereof, and a reference to the calculated capacity of the instance 402. Additionally, the origin server instance 402 can include a packaging module 434 and a streaming module 436 for packaging and delivering encoded media streams as described above.

Figure 5:
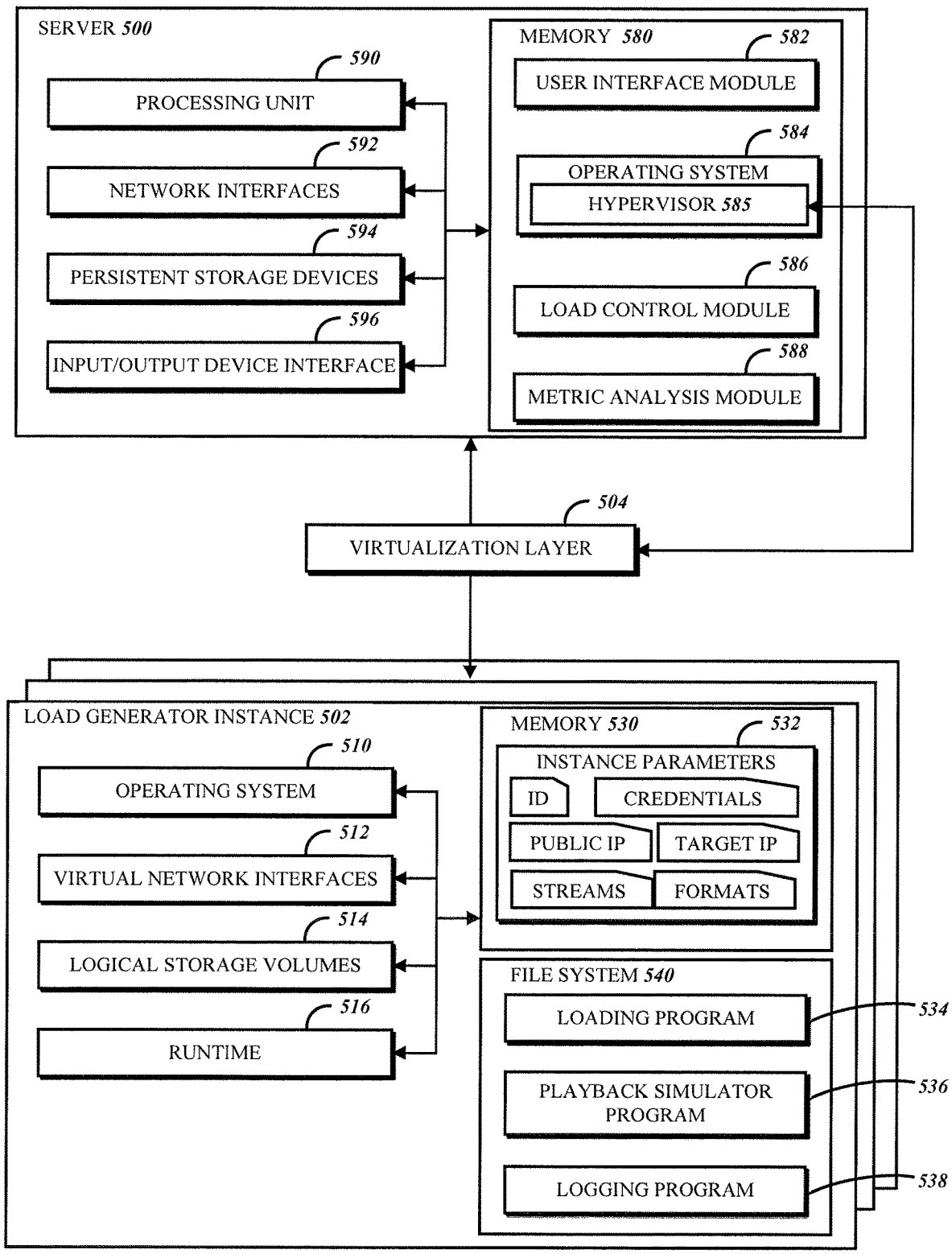
FIG. 5 is a block diagram of an example computing device architecture providing a hardware computing device and virtual computing resources for performing streaming capacity testing in accordance with various embodiments of the present disclosure.

FIG. 5 depicts a general architecture of another computing system, referenced as server 500, that can operate in the present systems. The general architecture of the server 500 depicted in FIG. 5 includes an arrangement of computer hardware and software modules that may be used to implement aspects of the present disclosure. The hardware modules may be implemented with physical electronic devices, as discussed in greater detail below. The server 500 may include many more (or fewer) elements than those shown in FIG. 5, and further may be used to implement one or more of the other components illustrated in FIGS. 1 and/or 2A-E. As illustrated, the server 500 includes a processing unit 590, a network interface 592, a hard drive or other persistent storage device 594, and an input/output device interface 596, all of which may communicate with one another by way of a communication bus. The network interface 592 may provide connectivity to one or more networks or computing systems. The processing unit 590 may thus receive information and instructions from other computing systems or services via a connected network. The processing unit 590 may also communicate to and from memory 580 and further provide output information for an optional display (not shown) via the input/output device interface 596. The input/output device interface 496 may also accept input from an optional input device (not shown).

The memory 580 may contain computer program instructions (grouped as modules in some embodiments) that the processing unit 590 executes in order to implement one or more aspects of the present disclosure. The memory 580 generally includes RAM, ROM and/or other persistent, auxiliary or non-transitory computer-readable media. The memory 580 may store an operating system 584 that provides computer program instructions for use by the processing unit 590. The operating system 584 may include or communicate with a hypervisor 585, which is capable of providing a virtualization layer 504 of the server 500. The virtualization layer 504 enables the physical computing resources of the server 500, such as the processing unit 590, network interfaces 592, persistent storage devices 594, and/or memory 580, to be allocated to and accessed by virtual computing resources such as a load generator instance 502. The memory 580 may further include computer program instructions and other information for implementing aspects of the present disclosure. For example, in one embodiment, the memory 580 includes a user interface module 582 that provides graphical and other user interfaces to connecting devices and receives, processes, and responds to requests received through the user interfaces. In addition, the memory 580 may include and/or communicate with one or more data repositories (not shown), for example, to access user program codes and/or libraries.

In addition to, in combination with, and/or in lieu of the user interface module 582, the memory 580 may include a load control module 486 and a metric analysis module 488 that may be executed by the processing unit 590. In one embodiment, the user interface module 582, load control module 586, and metric analysis module 588 individually or collectively implement various aspects of the present disclosure, e.g., receiving a request to execute a capacity test against an origin server, provisioning load control instances, and analyzing the monitoring data of the load control instances to determine if the capacity has been reached.

A load generator instance 502 hosted by the server 500 (i.e., in the virtualization layer 404) may be a virtual machine instance or one or more container instances executing in the virtualization layer 504 of the server 500. The load generator instance 502 may include an operating system 510, virtual network interface 512, and logical storage volumes 514 that are logically associated with physical resources of the underlying server 500, and the instance 502 may further include a runtime environment 516 in which software applications and other program instructions are executed. The load generator instance 502 may further include memory 530 containing parameters 532 of the instance, such as an instance identifier, a public IP address, credentials for accessing a target origin server at an IP address, and metadata describing the target origin server's encoded media streams and formats thereof. Additionally, the load generator instance 502 can include a file system 540 storing executable programs as software objects, scripts, program code, etc. The programs may include a loading program 534 for configuring the load generator instance 502 to apply a load to the target origin server, a playback simulator program 536 that processes a received media stream to determine if it contains errors, and/or a logging program 538 that records and/or processes data describing activity of the load generator instance 502, and may send the data, as log files, to a location (e.g., a data store; an analysis service) for metric analysis. Additionally or alternatively, the programs may include a streaming program that a load generator executes to apply the load (as in the loading program 534), receive the requested stream(s), and process the received stream to determine if it contains errors (as in the playback simulator program 536).

Figure 6:
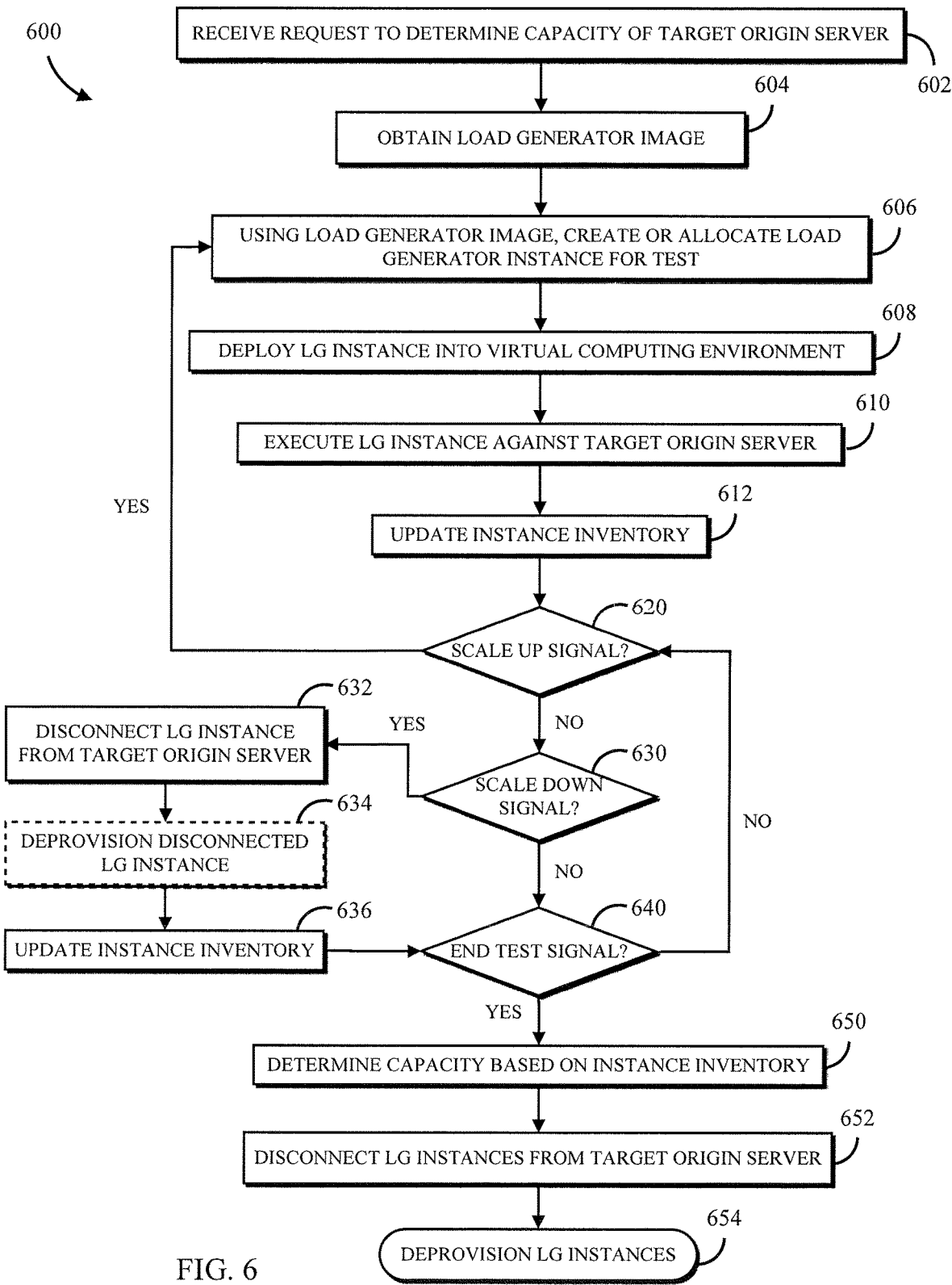
FIG. 6 is a flow diagram of an example method for automatically determining streaming capacity of an origin server, in accordance with the present disclosure.

Turning now to FIG. 6, an exemplary method 600 may be implemented by one or more hardware computing devices (e.g., of an architecture shown in FIG. 5) and/or a control system as described herein to determine the capacity of a target origin server in accordance with the present disclosure. At step 602, the system may receive a request to perform a capacity test against a target origin server. The request may be initiated by an administrator of the origin server via an API, or may be triggered by an event, such as the creation or updates to an origin server as described above. At step 604, the system may obtain a load generator image (e.g., from an associated data store), which may be a machine image that contains a software configuration for a virtual machine instance that performs the load generator functions. The machine image may include an operating system, a virtual network interface, and software programs for creating a load on the target origin server, processing received stream data, and logging instance activity as described above. At step 606, the system may use the load generator image to create or allocate a load generator instance that can be used in the capacity test.

At step 608, the system may deploy the load generator instance into a virtual computing environment, which in some embodiments may be associated with a requesting user. For example, the virtual environment may be a virtual private network associated with a user account that is also associated with the target origin server. The load generator instance may in some embodiments be deployed into a load generator group associated with the capacity test, which may be differentiated from other load generator groups executing against other endpoints or other origin servers. Additionally, in some embodiments deploying the load generator instance may include connecting the load generator instance to an external computing network, such as the internet, by assigning the load generator instance a public IP address. The virtual computing environment may have multiple virtual private networks that are geographically dispersed; the system may use a suitable network selection technique, such as random or round-robin selection, to select the virtual private network for deploying the load generator instance, so that subsequently deployed instances may be spread among the different networks.

At step 610, the system may cause the load generator instance to connect to the target origin server and begin applying a load, such as by requesting multiple streams at a predetermined request rate as described above. Additionally, at step 612 the system may update an inventory of the executing load generator instances to include the newly deployed instance. The system may monitor the health of executing load generator instances while waiting for a signal to modify the group of instances. Alternatively, the system may request (e.g., from a signaling system) a status update periodically. If a scale-up signal is received (step 620), the system may return to step 606 to create and deploy another load generator instance, increasing the load on the target origin server. If a scale-down signal is received (step 630), at step 632 the system may disconnect one of the load generator instances from the target origin server. For example, the system may select the first or the most recently deployed load generator instance and may cause it to terminate its stream and sever its connection to the target origin server's endpoint. At step 634, the system may optionally de-provision the disconnected load generator instance, such as by releasing the virtual computing resources allocated to it. At step 636, the system may update the instance inventory to reflect the reduction in executing load generator instances.

At some point, the system may receive a signal to end the capacity test (step 640). After receiving the signal, at step 650 the system may determine the capacity of the origin server. For example, the system may access the load generator instance inventory to determine the number of executing load generator instances. Then, if the number of connected user devices represented by a load generator instance is known, the system can calculate the capacity, in number of connected user devices, e.g., by multiplying the numbers. At step 652, the system may cause all of the executing load generator instances to disconnect from the target origin server, and at step 654 the system may de-provision the load generator instances as described above.

In some embodiments, the target origin server may be configured to send the capacity testing system a test media stream, or a variant of an actual encoded media stream, having pre-set standard encoding parameters. Advantageously, the system would not need to create or store multiple versions of a load generator image or accompanying programs. On the other hand, the "test" encoding may not be the encoding that the target origin server will usually be streaming; the actual encoded media stream may be much higher resolution or otherwise require more bandwidth, which reduces the capacity. The system may include conversion calculations (e.g., between formats, bitrates, resolutions, etc.) to account for this and maintain accuracy of the calculation.

Figure 7:
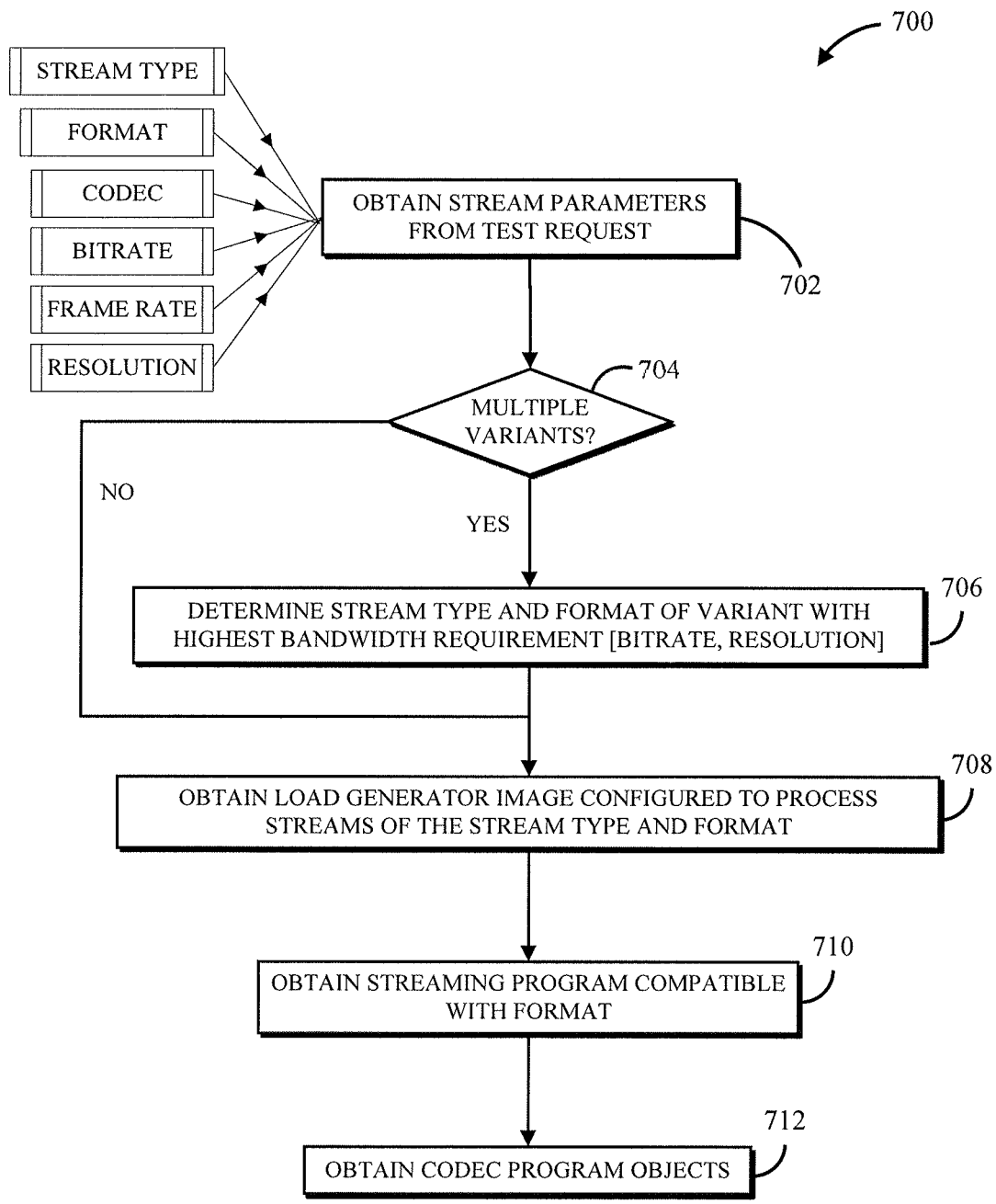
FIG. 7 is a flow diagram of an example method for determining a load generator configuration based on parameters of an encoded media stream.

In other embodiments, the system may be configured to adapt to the parameters of the target origin server's stream. FIG. 7 illustrates an example method 700 for obtaining the proper provisioning and deployment information for creating a new load generator instance (e.g., in accordance with method 600 of FIG. 6) depending on the parameters of the stream. At step 702, the system may obtain one or more stream parameters, such as from the capacity test request. As illustrated and described above, some such parameters may include a stream type (e.g., video, audio, JITP-encoded, etc.), a format (e.g., MPEG-4, QuickTime, Advanced Systems Format), one or more codecs used (e.g., H.264, MPEG-4 ASP, AAC, WMV9), the stream bitrate (e.g., in kbps) and frame rate (e.g., 25 or 30 fps), and the resolution (e.g., in pixels). At step 704, the system may determine whether there are multiple variants of the stream, encoded and/or packaged with different encoding parameters. It is common for the administrator of an origin server to design the server to provide a particular encoded stream in a series of variants each packaged to accommodate the technical capabilities of the requesting device (e.g., screen size, processor power, operating system, video player) and/or the network (e.g., network type (cellular, wife, etc.), protocols, available bandwidth). Table 1 provides an example set of variants for an H.264-encoded stream for HLS, with encoding parameters selected to accommodate stream requests based on network used, screen size (in pixels), and total bit rate (including video and audio bit rates).

TABLE 1

HLS H.264 Example Variant Encoding Settings

| Network | Dimensions | Frame Rate | Video Bit Rate | Audio Bit Rate | Total Bit Rate |
|---|---|---|---|---|---|
| Cell | 416 × 234 | 12 | 200 | 64 | 264 |
| Cell | 480 × 270 | 15 | 400 | 64 | 464 |
| WiFi/Cell | 640 × 360 | 29.97 | 800 | 64 | 864 |
| WiFi/Cell | 768 × 432 | 29.97 | 1200 | 96 | 1296 |
| WiFi | 960 × 540 | 29.97 or source | 2200 | 96 | 2296 |
| WiFi | 1280 × 720 | 29.97 or source | 3300 | 96 | 3396 |
| WiFi | 1280 × 720 or source | 29.97 or source | 5000 | 128 | 5128 |
| WiFi | 1280 × 720 or source | 29.97 or source | 6500 | 128 | 6628 |
| WiFi | 1920 × 1080 | 29.97 or source | 8600 | 128 | 8728 |

If there are multiple variants of the stream, in some embodiments, at step 706 the system can determine which of the variants has the highest bandwidth requirement, in order to test against it. This information may be included in the test request, or the system may query the media streaming system to obtain it. In other embodiments, the system may select a different one of the stream variants (step 706), such as the variant that has the set of parameters closest to a standard (or test) stream. For example, the system may, in connection with determining the variant to select, determine the amount of bandwidth that is available to facilitate the stream; then, the system (e.g., using the streaming program) may select the variant that has the highest quality deliverable using the available bandwidth.

When a variant is selected, or there is only one variant of the stream, at step 708 the system may obtain the load generator image that is configured to process streams of the identified stream type and format. For example, the system may query a database of load generator images to find a match to the obtained parameter values. At step 710, the system may obtain the streaming program that is compatible with the identified stream format. For example, if the stream is generated from an APPLE HLS stack, the system will obtain a streaming program with HLS-compatible load programming (i.e., requests manifest and segment files using HTML) and a QuickTime-enabled playback simulator to incorporate into the load generator instance. Similarly, at step 712 the system may determine which codec(s) are needed to decode the stream and obtain their program objects.

In another embodiment, there may be only one load generator image, which can receive any of the streaming programs and necessary codecs. The load generator (e.g., via the logging program) or the performance data storage system may be configured so that monitoring data associated with the load generator accounts for the different values of the stream parameters when calculating or otherwise processing the performance metrics, as described herein. That is, the system may be configured to calculate the capacity of the origin server based on the monitoring/performance data obtained while streaming any variant or combination of encoding parameters for the stream. In one embodiment, the capacity may be calculated based directly on the encoding parameters. In another embodiment, the encoding parameters of the stream actually tested may be compared to those of a "standard" test stream in order to produce a scalar by which the metric values or the metric thresholds may be multiplied to convert the metric comparison to a scale associated with the test stream. For example, using the variants of Table 1, the "standard" stream may be the 2296 bit stream, and the stream actually tested may be the 864 bit stream; the capacity calculation may account for the fact that the origin server can deliver the tested stream to 2.66 requesting devices for every one of the standard stream being delivered.

Figure 8:
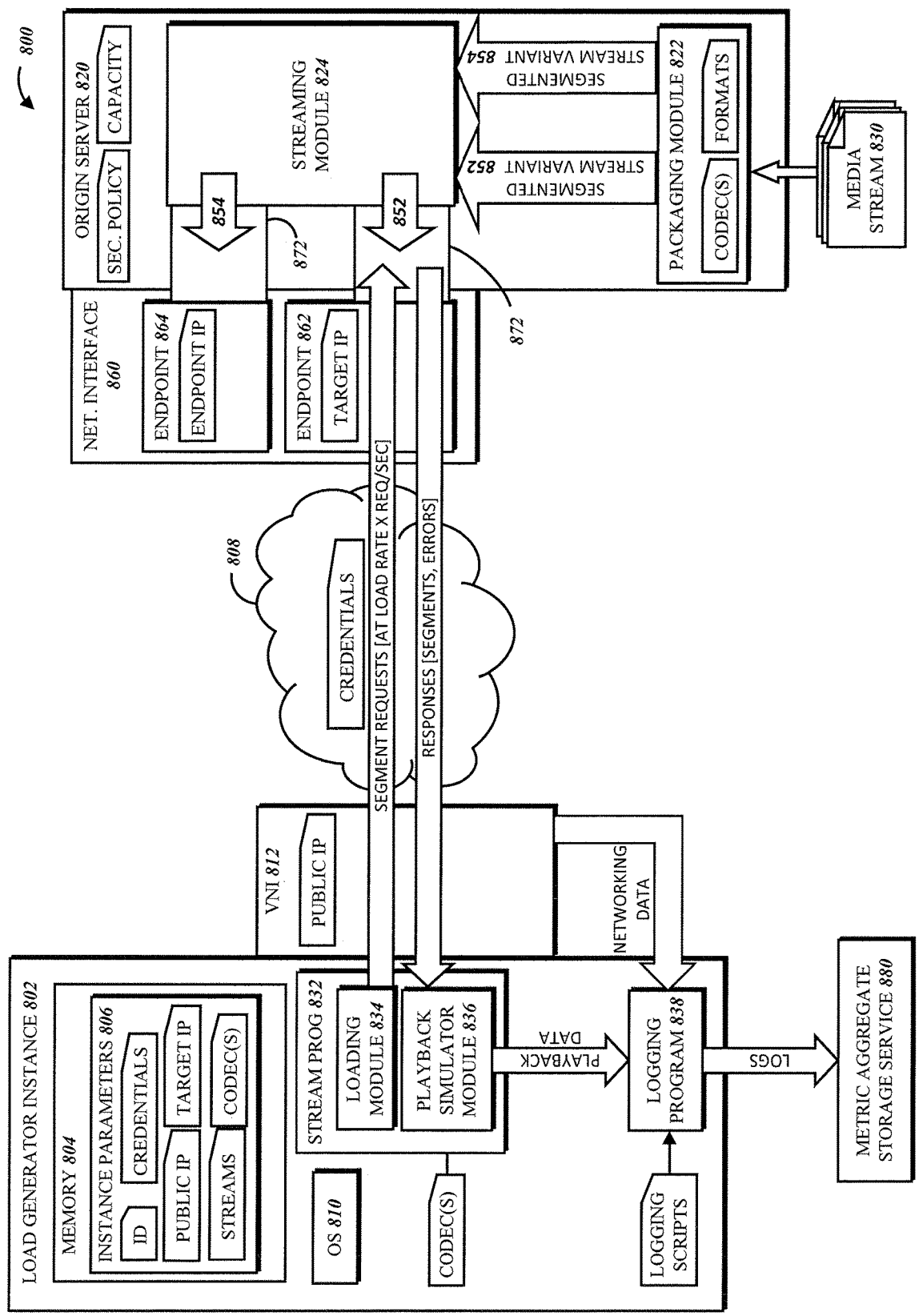
FIG. 8 is a block diagram of an example load generator instance applying a load to an origin server and generating monitoring data, in accordance with the present disclosure.

FIG. 8 provides a more detailed diagram of an example computing environment 800 in which a load generator instance 802 contributes to the capacity test of an origin server 820. In the illustrated example, the origin server 820 includes a packaging module 822 that encodes a media stream 830 into two variants (e.g., with different bitrates) and then divides the variants into segments to produce a first variant 852 and a second variant 854 having a lower quality and thus a lower bandwidth requirement than the first variant 852. A streaming module 824 of the origin server 820 then serves the segments of the respective variants 852, 854 through a channel 872 associated with the variants 852, 854 of the media stream 830. The channel 872, as described above, may have several endpoints 862, 864 of a network interface 860 coupled to the channel 872: a first endpoint 862 may be configured to receive the first segmented variant 852 and deliver the variant 852 to connected devices that, by virtue of their requesting the variant 852, are connected to the first endpoint 862 (i.e., via its IP address, which may be the target IP of the load generator's 802 instance parameter 806); a second endpoint 864 may be configured to receive the second segmented variant 854.

The load generator instance 802 may be a virtual machine instance with memory 804 and an operating system 810, and being attached to a virtual network interface 812, as described above. The memory 804 may include parameters 806 such as the instance's 802 identifier and public IP address, credentials that fulfill the security policy of the origin server 820, and the IP address of an endpoint 862 that the network interface 860 has assigned to the origin server 820 as described above. The load generator instance 802 may include a streaming program 832, which may, as described above, include a loading module 834 combined with or discrete from a playback simulator module 836. Segment requests from a loading program 834 of the load generator instance 802 are delivered to the streaming module 824 of the origin server 820, which should respond with the next segment of the higher-quality first variant 852 as long as the overall load on the origin server 820 is not too high. The playback simulator program 836 may receive the stream segments and decode them, and may identify stream errors or other occurrences, such as each time the second variant 854 is received instead of the first variant 852. The playback simulator program 836 may deliver monitoring data comprising the stream information to the logging program 838. The logging program 838 additionally may collect monitoring data comprising network activity information from the virtual network interface 812 or other components that observe the network traffic. The logging program 838 may produce logs, which may include all of the monitoring data or a subset thereof that is related to the desired performance metrics. The logs may be delivered to a metric aggregate storage service 880 as described above.

Figure 9:
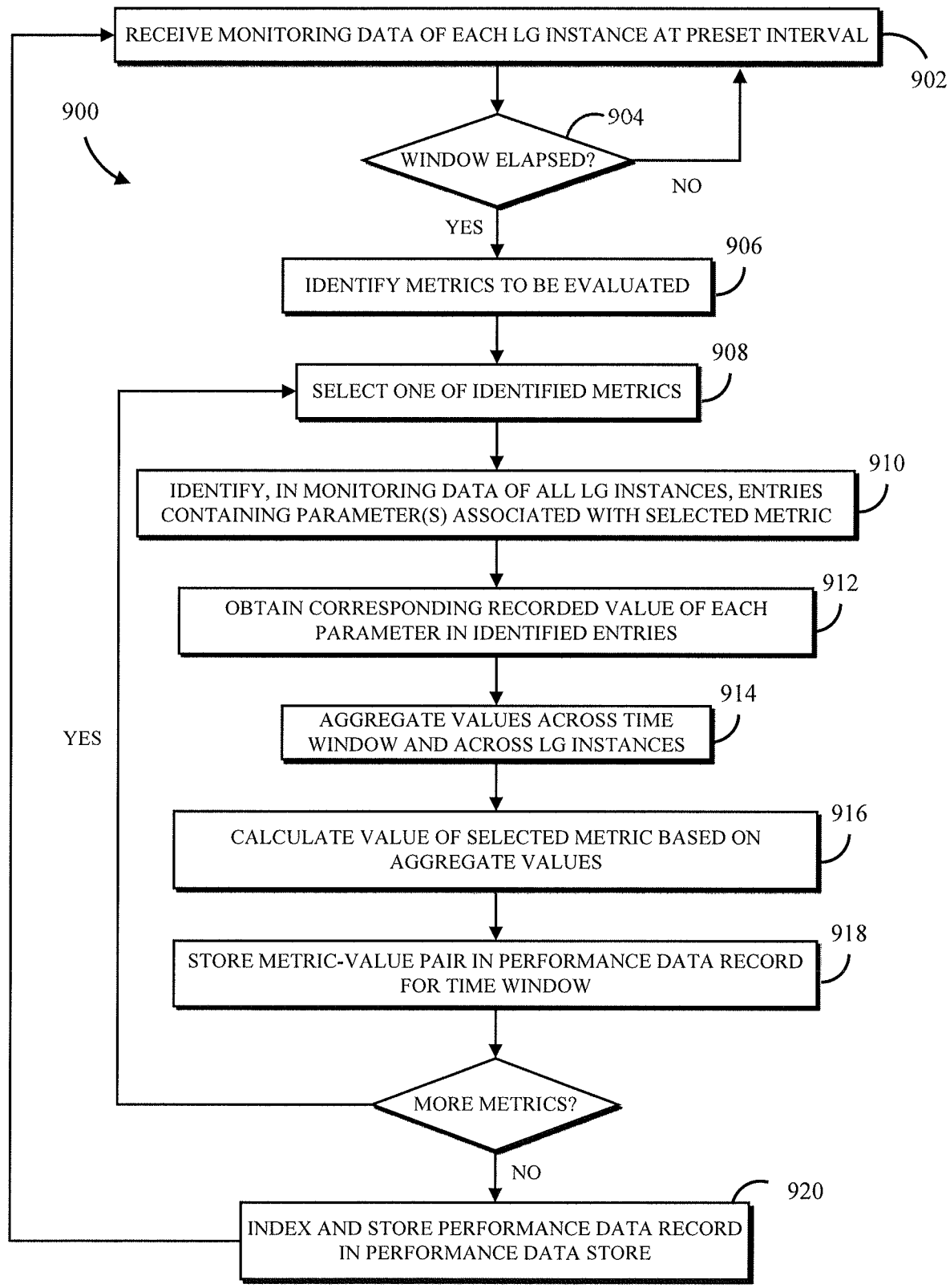
FIG. 9 is a flow diagram of an example method for calculating aggregate performance metrics.

FIG. 9 illustrates an example method 900 that may be performed by a component of the system, such as a metric analysis module, performance data storage system, or metric aggregate storage service that have been described previously. The method 900 contemplates aggregating monitoring data corresponding to desired performance metrics with respect to a time window of a fixed length. The monitoring data may be collected on a rolling basis or at an interval corresponding to the length of the time window. At step 902, the system may receive the monitoring data of each of the load generator instances currently executing against a target origin server. In various embodiments, the monitoring data may be received from the logging program of each load generator instance, or from the virtual network interfaces, or from a combination as well as from other components. The monitoring data may be received once per time window, but in the method 900 it is presumed to be received more frequently than that. Thus, the system may continuously or periodically receive monitoring data until a complete time window elapses (step 904).

At step 906, the system may identify the performance metrics to be evaluated. For example, the list of performance metrics may be stored by the service performing the aggregation, or the system may obtain the desired performance metrics from the set of metric threshold values or from another source. The system then selects one of the performance metrics (step 908) to start the analysis. At step 910, the system analyzes the monitoring data across all load generator instances to identify entries (e.g., in the logs) that contain information related to the selected parameter. In some embodiments, a list of metrics may include descriptors, such as field names, of parameters that are associated with each performance metric. For example, to determine latency the system may identify all entries in a network activity log that show the time stamp of a sent request destined for the endpoint, and that show the time stamp of a message received from the endpoint. At step 912 the system may obtain the recorded value of each of the parameters in each of the identified entries.

At step 914, the system may aggregate all of the record values for a particular parameter across both the duration of the time window and the number of executing load generator instances. For example, the system may determine the number of dropped packets recorded by each load generator instance during the time window, and sum the numbers to obtain the total number of dropped packets. In another example, the system may calculate the latency of each request by each load generator instance, by finding the difference between the time stamps of corresponding sent and received message entries. At step 916, the system may calculate the value of the selected metric from the aggregated values. For example, if the metric is average latency across all simulated user devices, the system may sum the calculated latencies and divide by the total number of requests.

At step 918, the system may store a metric-value pair in a performance data record for the current time window. If there are more performance metrics to calculate, the system may return to step 908. If not, at step 920 the system may index the performance data record with respect to other performance data records (i.e., from previous time windows) and store the performance data record in the performance data store.

Figure 10:
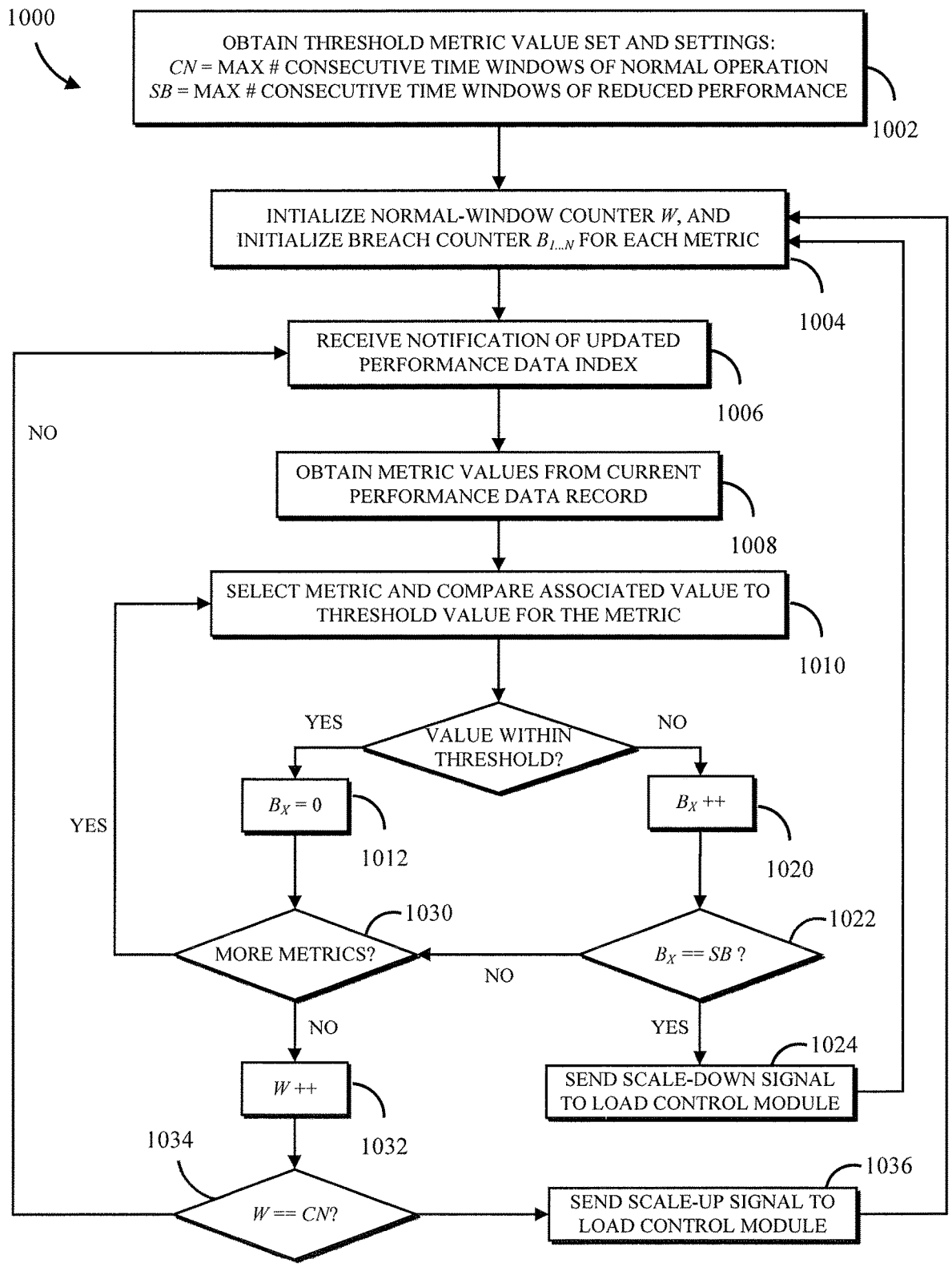
FIG. 10 is a flow diagram of an example method for generating signals to scale up or scale down a load during a capacity test, in accordance with the present disclosure.

FIG. 10 illustrates an example method 1000 of determining whether the capacity of an origin server may be exceeded by the load applied during a capacity test, and increasing or decreasing the load accordingly. The method 1000 presumes that performance metrics are calculated with respect to a known time window, but may be adapted to interpret continuous data. At step 1002, the system may obtain the set of metric threshold values as described above. The system may additionally obtain, such as from the test request or from a user setting stored in memory of a signaling system, the following settings: the number of consecutive time windows of normal operation that should pass before scaling up the load; and, the number of consecutive time windows in which a recorded metric value breaches the corresponding threshold value to be considered a sustained breach. In one example, the number of windows of normal operation is seven and the number of windows of breach is three.

At step 1004, the system may prepare to analyze a performance data record containing aggregated metric values for the previous time window, by initializing (i.e., setting to zero) counters for tracking the number of consecutive normal windows and the number of consecutive breaches for each metric. At step 1006, the system may receive a notification that the performance data record is ready to be retrieved (e.g., the index of performance data records was updated). At step 1008 the system may obtain the calculated values of the performance metrics of interest from the most recent performance data record, and at step 1010 the system may select a metric and compare its calculated value to the corresponding threshold value.

If the calculated value is within the threshold value, at step 1012 the system may set the corresponding breach counter for the metric to zero, indicating there are no consecutive windows in which a breach of that metric occurred. If the calculated value is not within the threshold value (i.e., a breach occurred, indicating below-acceptable streaming performance by the origin server), at step 1020 the system may increment (i.e., add one to the current value of) the breach counter for the corresponding metric. Then, at step 1022 the system may evaluate whether, including the breach of the current window, the corresponding metric has been in breach for the maximum number of consecutive windows (e.g., the new value for the metric's breach counter is equal to the sustained breach setting) and should be considered a sustained breach. If so, at step 1024 the system sends a scale-down signal to the load control module to reduce the load on the origin server, and returns to step 1004 (re-initialize counters and wait for next window).

If the calculated value is within the threshold, or there have not been sufficient consecutive breaches to constitute a sustained breach, at step 1030 the system may determine whether there are more performance metrics to evaluate. If so, the system returns to step 1010 to select and process the next metric. If not, that means none of the performance metrics are in sustained breach, and the system at step 1032 may increment the counter tracking consecutive windows of normal operation. At step 1034, the system may evaluate whether, including the current normal-operation window, the maximum number of consecutive normal-operation windows has been reaching, indicating the load on the origin server should be increased. If not, the system returns to step 1006 to evaluate the performance metrics in the next window. If so, at step 1036 the system may send the scale-up signal to the load control module and then returns to step 1004 (re-initialize counters and wait for next window).

Thus, as described and contemplated herein, the present disclosure provides a system for automatically quantifying streaming capacity of a media streaming system, the system including one or more computing hardware devices including a processor and memory storing specific computing program instructions that, when executed by the processor, cause the system to: receive a request to perform a capacity test on the media streaming system; and identify, from the request, an endpoint of the media streaming system accessible by one or more requesting devices over a computer network. Beginning at a start time and for a total duration of the capacity test ending at an end time, execution of the instructions causes the system to cause each load generator in a scalable group of load generators, each comprising discrete computing resources and connecting to the computer network, to: initiate a plurality of streams of encoded media from an origin server connected to the endpoint to the load generator, the plurality of streams applying to the origin server a corresponding load, measured by a data rate between the origin server and the load generator, that represents streaming by the origin server of the encoded media to a representative number of connected user devices; and, generate monitoring data describing network activity between the origin server and the load generator. Execution of the instructions further causes the system to: at a first interval, determine whether a plurality of performance metrics, calculated from the corresponding monitoring data collected by each of the load generators in the group, indicate a streaming performance of the origin server is below an acceptable quality of service level; responsive to an indication that the streaming performance is below the acceptable quality of service level, remove one of the load generators in the group from the group, such that the removed load generator disconnects from the origin server; and, at a predetermined number of consecutive first intervals in which the streaming performance is at or above the acceptable quality of service level, deploy an additional load generator into the group. Responsive to the capacity test, the system determines a maximum capacity of the origin server and sends the maximum capacity to the media streaming system.

The system may further include a data store accessible by the one or more computing hardware devices, the data store storing a load generator template comprising information for creating a virtual machine instance having installed thereon program objects that, when executed: transmit, at a request rate of messages per second, a plurality of messages to a specified address on the computer network, the plurality of messages comprising requests to receive a specified media stream; and, simulate playback of a received encoded media stream, the simulating including decoding the received encoded media stream to produce decoded media, identifying errors in the decoded media without rendering the decoded media for display, and recording identified errors. The computing program instructions, when executed by the processor, may further cause the system to: create a plurality of load generators, including each of the load generators in the group, in a virtual computing environment, the system identifying the endpoint as the specified address, such that each of the load generators in the group applies the corresponding load by transmitting, at the request rate, requests to stream the encoded media from the origin server; and, cause each of the load generators in the group to generate the corresponding monitoring data to further include the corresponding identified errors.

The computing program instructions, when executed by the processor, may further cause the system to: receive, over a time window defined by the first interval, a monitoring data stream including the corresponding monitoring data generated during the time window by each of the load generators in the group; determine that the monitoring data stream contains a plurality of recorded values for a parameter associated with a selected metric of the plurality of performance metrics; produce an aggregate value for the parameter based on the plurality of recorded values; calculate, based at least in part on the aggregate value, an indexed value for the selected metric over the time window; and, use the indexed value to determine whether the plurality of performance metrics indicates streaming performance of the origin server is below the acceptable quality of service level. The memory of the system may store a set of metric threshold values associated with the acceptable quality of service level. The one or more computing hardware devices may be in communication with a performance data store storing a plurality of performance data records each associated with a discrete time window occurring between the start time and the end time and having a sequential index. To determine whether the plurality of performance metrics indicates streaming performance of the origin server is below the acceptable quality of service level, the computing program instructions, when executed by the processor, may cause the system to: obtain, from the performance data store using the index, a first performance data record of the plurality of performance data records, the first performance data record being associated with a most recently elapsed time window; determine, from the first performance record, corresponding calculated values for each of the plurality of performance metrics; compare, for each of the performance metrics, the corresponding calculated value to the corresponding threshold value; and, responsive to a comparison result indicating that one of the threshold values has been breached, produce the indication that the streaming performance is below the acceptable quality of service level.

In another aspect, the present disclosure provides a system including one or more computing hardware devices including a processor and memory storing specific computing program instructions that, when executed by the processor, cause the system to: receive a request to perform a capacity test on a media streaming system connected to a computer network; configure first computing resources to connect to the computer network at one or more network locations; cause the first computing resources to establish a set of concurrent streams of encoded media from one or more origin servers of the media streaming system to the one or more network locations, the set of concurrent streams imparting a load on the one or more origin servers; receive one or more scale-up signals or one or more scale-down signals; responsive to receiving the one or more scale-up signals, cause the first computing resources to establish one or more additional concurrent streams to the set of concurrent streams, increasing the load on the one or more origin servers; responsive to receiving the one or more scale-down signals, cause the first computing resources to terminate one or more of the set of concurrent streams, decreasing the load on the one or more origin servers; receive an end test signal; and, responsive to receiving the end test signal, determine, based on a count of the concurrent streams in the set of concurrent streams at receipt of the end test signal, a streaming capacity of the media streaming system, and cause the first computing resources to terminate the set of concurrent streams.

The one or more computing hardware devices may be in communication with a metric analysis system, and the program instructions, when executed by the processor, may further cause the system to configure the first computing resources to generate monitoring data associated with the set of concurrent streams and send the monitoring data to the metric analysis system. The system may receive a first of the one or more scale-up signals from the metric analysis system in response to a determination by the metric analysis system that the monitoring data indicates a performance of the one or more origin servers in delivering the set of concurrent streams at least meets an acceptable quality of service level. The system may receive a first of the one or more scale-down signals from the metric analysis system in response to a determination by the metric analysis system that the monitoring data indicates the performance of the one or more origin servers is below the acceptable quality of service level. The monitoring data may include network activity data associated with transmissions between an endpoint of the media streaming system and a plurality of public IP addresses associated with the first computing resources. The monitoring data may include streaming errors detected by the first computing resources during decoding of a first stream of the set of concurrent streams. To establish the set of concurrent streams, the first computing resources may be configured to: decode the encoded media to produce decoded media; without rendering the decoded media for display, detect errors in the decoded media; and, include detected errors in the monitoring data.

The program instructions, when executed by the processor, may further cause the system to: configure second computing resources to collect monitoring data describing network activity between the media streaming system and the one or more network locations; receive the monitoring data; determine, from the monitoring data, whether a streaming performance of the one or more origin servers, under the load applied when the monitoring data was produced, meets an acceptable quality of service level; responsive to a determination that the streaming performance does not meet the acceptable quality of service level, generate a first of the one or more scale-down signals; and responsive to a determination that the streaming performance meets the acceptable quality of service level, generate a first of the one or more scale-up signals. To determine whether the streaming performance meets the acceptable quality of service, the program instructions, when executed by the processor, may further cause the system to: obtain a set of metric thresholds associating a threshold value for each of a plurality of performance metrics with the acceptable quality of service level; determine, from the monitoring data, a recorded value for each of the plurality of performance metrics; and, compare the recorded value to the threshold value for each performance metric, wherein the streaming performance does not meet the acceptable quality of service level when the recorded value does not meeting the threshold value. The threshold values of the plurality of performance metrics may be based on a predetermined stream format of the encoded media, and the first computing resources may be configured to decode the encoded media using the predetermined stream format.

The first computing resources may include one or more virtual machine instances. The one or more virtual machine instances may include a first virtual machine instance that receives at least a portion of the set of concurrent streams; to establish one or more additional concurrent streams in the set of concurrent streams, the program instructions, when executed by the processor, may further cause the system to deploy a second virtual machine instance that receives the one or more additional concurrent streams. The first computing resources may further include a plurality of containers; the program instructions, when executed by the processor, may further cause the system to deploy one or more additional container instances to establish the one or more additional concurrent streams.

In yet another aspect, the present disclosure provides a system including one or more computing hardware devices including physical computing resources including a processor and memory storing specific computer-executable program instructions that, when executed by the processor, cause the system to implement, using the physical computing resources, a data store containing a load generator template including information for launching virtual resource instances with a predetermined configuration, and a load control system communicatively coupled to the data store and configured to: create, in a virtual computing environment, a load generator instance from the load generator template; cause the load generator instance to establish a set of streams of encoded media from an origin server, the set of streams contributing to a load applied to the origin server; receive a signal and determine whether the signal is an end signal or a scaling signal associated with a quality of service level of the origin server while under the load; responsive to the signal being an end signal, determine, based on a count of streams contributing to the load when the end signal is received, a capacity of the media streaming system; responsive to the signal indicating to increase the load, create an additional load generator instance in the virtual computing environment from the load generator template, cause the additional load generator instance to establish a corresponding set of streams of encoded media from the origin server, the corresponding set of streams contributing to the load applied to the origin server, and wait to again receive the signal; and, responsive to the signal indicating to decrease the load, terminate the set of streams corresponding to a selected load generator instance, deactivate the selected load generator instance, and wait again to receive the signal. Based on the predetermined configuration, the load generator instance may be configured to: obtain a request rate measured in number of messages per second; obtain a segment length associated with the encoded media; and, to establish the corresponding set of streams, send to the origin server a maximum number of segment requests for a first segment of the encoded media, the maximum number determined by multiplying the request rate by the segment length, to create the maximum number of streams.

The load control system may be configured to deploy each load generator instance to a corresponding network location in the virtual computing environment so that a plurality of the load generator instances are one or both of geographically distant and disposed in different virtual private networks. Based on the predetermined configuration, the load generator instance may be enabled to: decode the encoded media to produce decoded media; analyze the decoded media to identify streaming errors; and create a log of the streaming errors. The program instructions, when executed by the processor, may further cause the system to implement, using the physical computing resources, a metric aggregate storage system communicatively coupled to the virtual computing environment, and a signaling system communicatively coupled to the load control system and to the performance data store. The metric aggregate storage system may be configured to: receive corresponding monitoring data, of each load generator instance, including the log of streaming errors and network activity data describing performance metrics of the corresponding set of streams; produce aggregate values for a plurality of metrics defining the quality of service level; store the aggregate values in a performance data record associated with a time window in which the corresponding monitoring data was generated; and, store the performance data record in a performance data store. The signaling system may be configured to: obtain the performance data record; determine whether the aggregate values indicate a quality of service level that is below an acceptable quality of service level; responsive to a determination that the quality of service level is below the acceptable quality of service level, send to the load control system the signal indicating to decrease the load; and responsive to a determination that the quality of service level is not below the acceptable quality of service level, send to the load control system the signal indicating to increase the load.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It should be understood that the above described steps of the processes of FIG. 2A-E, 6, 7, 9, or 10 can be executed or performed in any order or sequence not limited to the order and sequence shown and described in the figures. Also, some of the above steps of the processes of FIG. 2A-E, 6, 7, 9, or 10 can be executed or performed substantially simultaneously where appropriate or in parallel to reduce latency and processing times.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising one or more computing hardware devices including a processor and memory storing specific computing program instructions that, when executed by the processor, cause the system to:
   receive a request to perform a capacity test on a media streaming system connected to a computer network;
   configure first computing resources to connect to the computer network at one or more network locations;
   cause the first computing resources to establish a set of concurrent streams of encoded media from one or more origin servers of the media streaming system to the one or more network locations, the set of concurrent streams imparting a load on the one or more origin servers;
   receive one or more scale-up signals or one or more scale-down signals;
   responsive to receiving the one or more scale-up signals, cause the first computing resources to establish one or more additional concurrent streams to the set of concurrent streams, increasing the load on the one or more origin servers;
   responsive to receiving the one or more scale-down signals, cause the first computing resources to terminate one or more of the set of concurrent streams, decreasing the load on the one or more origin servers;
   receive an end test signal;
   responsive to receiving the end test signal:
      determine a number of executing load generator instances when the end test signal is received;
      determine a count of the concurrent streams in the set of concurrent streams when the end test signal is received based on the number of executing load generator instances and a number of connected user devices represented by each load generator instance;
      determine, based on the count of the concurrent streams in the set of concurrent streams at receipt of the end test signal, a streaming capacity of the media streaming system; and
      cause the first computing resources to terminate the set of concurrent streams.

2. The system of claim 1, wherein:
   the one or more computing hardware devices are in communication with a metric analysis system;
   the program instructions, when executed by the processor, further cause the system to configure the first computing resources to generate monitoring data associated with the set of concurrent streams and send the monitoring data to the metric analysis system;
   the system receives a first of the one or more scale-up signals from the metric analysis system in response to a determination by the metric analysis system that the monitoring data indicates a performance of the one or more origin servers in delivering the set of concurrent streams at least meets an acceptable quality of service level; and the system receives a first of the one or more scale-down signals from the metric analysis system in response to a determination by the metric analysis system that the monitoring data indicates the performance of the one or more origin servers is below the acceptable quality of service level.

3. The system of claim 2, wherein the monitoring data comprises network activity data associated with transmissions between an endpoint of the media streaming system and a plurality of public IP addresses associated with the first computing resources.

4. The system of claim 2, wherein the monitoring data comprises streaming errors detected by the first computing resources during decoding of a first stream of the set of concurrent streams.

5. The system of claim 2, wherein to establish the set of concurrent streams, the first computing resources are configured to:
 decode the encoded media to produce decoded media;
 without rendering the decoded media for display, detect errors in the decoded media; and
 include detected errors in the monitoring data.

6. The system of claim 1, wherein the program instructions, when executed by the processor, further cause the system to:
 configure second computing resources to collect monitoring data describing network activity between the media streaming system and the one or more network locations;
 receive the monitoring data;
 determine, from the monitoring data, whether a streaming performance of the one or more origin servers, under the load applied when the monitoring data was produced, meets an acceptable quality of service level;
 responsive to a determination that the streaming performance does not meet the acceptable quality of service level, generate a first of the one or more scale-down signals; and
 responsive to a determination that the streaming performance meets the acceptable quality of service level, generate a first of the one or more scale-up signals.

7. The system of claim 6, wherein to determine whether the streaming performance meets the acceptable quality of service, the program instructions, when executed by the processor, further cause the system to:
 obtain a set of metric thresholds associating a threshold value for each of a plurality of performance metrics with the acceptable quality of service level;
 determine, from the monitoring data, a recorded value for each of the plurality of performance metrics; and
 compare the recorded value to the threshold value for each performance metric, wherein the streaming performance does not meet the acceptable quality of service level when the recorded value does not meeting the threshold value.

8. The system of claim 7, wherein the threshold values for each of the plurality of performance metrics are based on a predetermined stream format, wherein the encoded media has the predetermined stream format and the first computing resources are configured to decode the encoded media using the predetermined stream format.

9. The system of claim 1, wherein the first computing resources comprise one or more virtual machine instances.

10. The system of claim 9, wherein the one or more virtual machine instances include a first virtual machine instance that receives at least a portion of the set of concurrent streams, and to establish one or more additional concurrent streams in the set of concurrent streams, the program instructions, when executed by the processor, further cause the system to deploy a second virtual machine instance that receives the one or more additional concurrent streams.

11. The system of claim 9, wherein the first computing resources further comprise a plurality of containers, the program instructions, when executed by the processor, further causing the system to deploy one or more additional container instances to establish the one or more additional concurrent streams.

12. A system, comprising one or more computing hardware devices including physical computing resources including a processor and memory storing specific computer-executable program instructions that, when executed by the processor, cause the system to implement, using the physical computing resources:
 a data store containing a load generator template comprising information for launching virtual resource instances with a predetermined configuration; and
 a load control system communicatively coupled to the data store and configured to:
  create, in a virtual computing environment, a load generator instance from the load generator template;
  cause the load generator instance to establish a set of streams of encoded media from an origin server, the set of streams contributing to a load applied to the origin server;
  receive a signal and determine whether the signal is an end signal or a scaling signal associated with a quality of service level of the origin server while under the load;
  responsive to the signal being an end signal:
   determine a number of executing load generator instances when the end signal is received;
   determine a count of streams contributing to the load when the end signal is received based on the number of executing load generator instances and a number of connected user devices represented by each load generator instance;
   determine, based on the count of streams contributing to the load when the end signal is received, a capacity of the media streaming system;
  responsive to the signal indicating to increase the load:
   create an additional load generator instance in the virtual computing environment from the load generator template;
   cause the additional load generator instance to establish a corresponding set of streams of encoded media from the origin server, the corresponding set of streams contributing to the load applied to the origin server; and
   wait to again receive the signal;
  responsive to the signal indicating to decrease the load:
   terminate the set of streams corresponding to a selected load generator instance;
   deactivate the selected load generator instance; and
   wait again to receive the signal.

13. The system of claim 12, wherein based on the predetermined configuration, the load generator instance is configured to:
 obtain a request rate measured in number of messages per second;

obtain a segment length associated with the encoded media; and to establish the corresponding set of streams, send to the origin server a maximum number of segment requests for a first segment of the encoded media, the maximum number determined by multiplying the request rate by the segment length, to create the maximum number of streams.

14. The system of claim 12, wherein the load control system is configured to deploy each load generator instance to a corresponding network location in the virtual computing environment so that a plurality of the load generator instances are one or both of geographically distant and disposed in different virtual private networks.

15. The system of claim 12, wherein based on the predetermined configuration, the load generator instance is enabled to:

decode the encoded media to produce decoded media;
analyze the decoded media to identify streaming errors; and
create a log of the streaming errors.

16. The system of claim 15, wherein the program instructions, when executed by the processor, cause the system to implement, using the physical computing resources:

a metric aggregate storage system communicatively coupled to the virtual computing environment and configured to:
  receive corresponding monitoring data of each load generator instance, the corresponding monitoring data comprising the log of streaming errors and network activity associated with the corresponding set of streams;
  produce, from the corresponding monitoring data of each load generator instance, aggregate values for a plurality of metrics defining the quality of service level;
  store the aggregate values in a performance data record associated with a time window in which the corresponding monitoring data was generated; and
  store the performance data record in a performance data store; and a signaling system communicatively coupled to the load control system and to the performance data store and configured to:
  obtain the performance data record;
  determine whether the aggregate values indicate a quality of service level that is below an acceptable quality of service level;
  responsive to a determination that the quality of service level is below the acceptable quality of service level, send to the load control system the signal indicating to decrease the load; and
  responsive to a determination that the quality of service level is not below the acceptable quality of service level, send to the load control system the signal indicating to increase the load.

17. The system of claim 16, wherein the signaling system is further configured to:

responsive to a determination that a predetermined number of time windows reflecting normal operation have elapsed subsequent to sending the signal indicating to decrease the load, send to the load control system the end signal.

18. The system of claim 16, wherein the signaling system is further configured to:

at a first interval, determine whether each of the plurality of metrics associated with a most recent time window indicate a streaming performance of the origin server is below an acceptable quality of service level;
responsive to an indication that the streaming performance is below the acceptable quality of service level based on an aggregate value for a particular metric of the plurality of metrics, increment a breach counter for the particular metric, wherein the breach counter for the particular metric indicates a number of consecutive time windows, including the most recent time window that the particular metric has been indicative of the streaming performance of the origin server is below an acceptable quality of service level;
evaluate whether the breach counter has reached a predetermined threshold; and
responsive to the breach counter reaching the predetermined threshold, determine that the quality of service level is below the acceptable quality of service level.

19. The system of claim 12, wherein load control system is further configured to:

configure the load generator instance and the additional load generator instance to generate monitoring data associated with the set of concurrent streams and send the monitoring data to a metric aggregate storage system that is configured to produce aggregate values for a plurality of metrics defining the quality of service level;
wherein the load control system receives a scaling signal to increase the load from a signaling system in response to a determination by the signaling system that the quality of service level is not below the acceptable quality of service level, the signaling system is communicatively coupled to the load control system and is configured to determine whether the aggregate values indicate a quality of service level that is below an acceptable quality of service level; and
wherein the load control system receives a scaling signal to decrease the load from the signaling system in response to a determination by the signaling system that the quality of service level is below the acceptable quality of service level.

* * * * *